(12) United States Patent
Zhao et al.

(10) Patent No.: US 11,095,891 B2
(45) Date of Patent: Aug. 17, 2021

(54) ENCODING METHOD AND APPARATUS, AND DECODING METHOD AND APPARATUS

(71) Applicant: Huawei Technologies Co., Ltd., Shenzhen (CN)

(72) Inventors: Yin Zhao, Hangzhou (CN); Haitao Yang, Shenzhen (CN); Shan Gao, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/263,824

(22) Filed: Jan. 31, 2019

(65) Prior Publication Data
US 2019/0166367 A1   May 30, 2019

Related U.S. Application Data

(63) Continuation of application No. PCT/CN2017/073004, filed on Feb. 6, 2017.

(51) Int. Cl.
*H04N 19/119* (2014.01)
*H04N 19/176* (2014.01)
(Continued)

(52) U.S. Cl.
CPC ......... *H04N 19/119* (2014.11); *H04N 19/176* (2014.11); *H04N 19/46* (2014.11); *H04N 19/70* (2014.11); *H04N 19/96* (2014.11)

(58) Field of Classification Search
None
See application file for complete search history.

(56) References Cited

U.S. PATENT DOCUMENTS 9,183,458 B2 * 11/2015 Baheti .................. G06K 9/3233
9,215,463 B2 * 12/2015 Kim ....................... H04N 19/40
(Continued)

FOREIGN PATENT DOCUMENTS

CN       102771124 A    11/2012
CN       102857763 A     1/2013
(Continued)

OTHER PUBLICATIONS

Foreign Communication From a Counterpart Application, European Application No. 17895100.0, Extended European Search Report dated Jun. 3, 2019, 13 pages.
(Continued)

*Primary Examiner* — Chikaodili E Anyikire
(74) *Attorney, Agent, or Firm* — Conley Rose, P.C.

(57) ABSTRACT

An encoding and decoding method, where the decoding method includes obtaining first information of a coding tree unit (CTU) in a to-be-decoded picture from a bitstream, where the first information indicates an allowed value range of a width-to-height ratio of a coding unit (CU) obtained by dividing the CTU, obtaining division information of the CTU from the bitstream, dividing the CTU into one or more CUs based on the first information and the division information, where a width-to-height ratio of the one or more CUs falls within the value range indicated by the first information, and the plurality of CUs do not overlap each other, and decoding the one or more CUs to obtain a reconstructed pixel of the one or more CUs.

20 Claims, 9 Drawing Sheets

(51) Int. Cl.
*H04N 19/46* (2014.01)
*H04N 19/96* (2014.01)
*H04N 19/70* (2014.01)

(56) References Cited

U.S. PATENT DOCUMENTS

| | | | |
|---|---|---|---|
| 10,511,839 B2* | 12/2019 | Park | H04N 19/52 |
| 2011/0134998 A1 | 6/2011 | Lee et al. | |
| 2012/0328015 A1 | 12/2012 | Kim et al. | |
| 2013/0039417 A1* | 2/2013 | Wang | H04N 19/122 375/240.12 |
| 2013/0156328 A1* | 6/2013 | Wang | H04N 19/51 382/203 |
| 2014/0192890 A1* | 7/2014 | Lee | H04N 19/30 375/240.16 |
| 2015/0256851 A1 | 9/2015 | Abe et al. | |
| 2015/0288970 A1* | 10/2015 | Park | H04N 19/105 375/240.13 |
| 2017/0208336 A1* | 7/2017 | Li | H04N 19/60 |
| 2017/0347096 A1* | 11/2017 | Hong | H04N 19/159 |
| 2018/0070100 A1* | 3/2018 | Chen | H04N 19/13 |
| 2018/0205972 A1* | 7/2018 | Piao | H04N 19/44 |
| 2018/0227593 A1* | 8/2018 | Chen | H04N 19/107 |
| 2018/0278940 A1* | 9/2018 | Park | H04N 19/523 |
| 2018/0367818 A1* | 12/2018 | Liu | H04N 19/124 |
| 2019/0166367 A1* | 5/2019 | Zhao | H04N 19/119 |
| 2019/0200021 A1* | 6/2019 | Park | H04N 19/96 |
| 2019/0208202 A1 | 7/2019 | Fukushima | |
| 2019/0364279 A1 | 11/2019 | Yasugi et al. | |

FOREIGN PATENT DOCUMENTS

| | | |
|---|---|---|
| CN | 102972026 A | 3/2013 |
| CN | 103733628 A | 4/2014 |
| EP | 2592834 A1 | 5/2013 |
| JP | 2012019490 A | 1/2012 |
| JP | 2013513330 A | 4/2013 |
| KR | 20130098187 A | 9/2013 |
| KR | 20160003593 A | 1/2016 |
| WO | 2014120367 A1 | 8/2014 |
| WO | 2017008678 A1 | 1/2017 |
| WO | 2018105148 A1 | 6/2018 |
| WO | 2018110600 A1 | 6/2018 |

OTHER PUBLICATIONS

Machine Translation and Abstract of Chinese Publication No. CN102857763, Jan. 2, 2013, 26 pages.
"Series H: Audiovisual and Multimedia Systems, Infrastructure of audiovisual services—Coding of moving video High efficiency video coding," ITU-T H.265, Dec. 2016, 664 pages.
Foreign Communication From a Counterpart Application, PCT Application No. PCT/CN2017/073004, English Translation of International Search Report dated Oct. 11, 2017, 2 pages.
Le Leannec, F., et al., "Asymmetric Coding Units in QTBT," Joint Video Exploration Team (JVET) of ITU-T SG 16 WP 3 and 1S0/IEC JTC 1/SC 29/WW 11, No. JVET-D0064, 4th Meeting: Chengdu, CN, Oct. 15-21, 2016, 10 pages.
Li, X., et al., "Mult-Type-Tree," JVET-D0117r1, JVET of ITU-T SG 16 WP 3 and ISO/IEC JTC 1/SC 29/WG 11, 4th Meeting: Chengdu, CN, Oct. 16, 2016, 3 pages.

* cited by examiner

ENCODING METHOD AND APPARATUS, AND DECODING METHOD AND APPARATUS

CROSS-REFERENCE TO RELATED APPLICATIONS

This application is a continuation of International Patent Application No. PCT/CN2017/073004 filed on Feb. 6, 2017, the disclosure of which is hereby incorporated by reference in its entirety.

TECHNICAL FIELD

This application relates to the field of encoding and decoding technologies, and in particular, to an encoding method and apparatus, and a decoding method and apparatus.

BACKGROUND

When encoding a picture, an encoder side usually divides a coding tree unit (CTU) in the picture into a plurality of coding units (CUs), and encodes the plurality of CUs. The encoder side may divide the CTU into the plurality of CUs in a plurality of division manners. For example, the encoder side may divide the CTU according to one or more of division types such as a quadtree (also referred to as QT), a ternary tree (also referred to as TT), and a binary tree (also referred to as BT). In addition, the encoder side may further divide a CU obtained by dividing the CTU to obtain smaller CUs.

Therefore, there are many different division manners of dividing a CTU into a plurality of CUs. The encoder side usually selects, as a target division manner, a division manner corresponding to a lowest rate-distortion cost from all possible division manners using a rate-distortion optimization algorithm, then divides the CTU in the target division manner, and encodes the CUs obtained by dividing the CTU to obtain a bitstream.

When selecting the target division manner, the encoder side needs to attempt to perform encoding in a plurality feasible division manners according to the rate-distortion optimization algorithm, and compare rate-distortion costs corresponding to the division manners, to obtain an optimal division manner. When there are a relatively large quantity of feasible division manners, a relatively large amount of calculation may be required, and calculation complexity of the encoder side increases.

SUMMARY

This application provides an encoding method and apparatus, and a decoding method and apparatus, to improve encoding and decoding efficiency.

According to a first aspect, a decoding method is provided. The method includes obtaining first information of a CTU in a to-be-decoded picture from a bitstream, where the first information is used to indicate an allowed value range of a width-to-height ratio of a CU obtained by dividing the CTU, obtaining division information of the CTU from the bitstream, and dividing the CTU into one or more CUs based on the first information and the division information, where a width-to-height ratio of the one or more CUs falls within the value range indicated by the first information, and the plurality of CUs do not overlap each other, and decoding the one or more CUs to obtain a reconstructed pixel of the one or more CUs.

In this application, the allowed value range of the width-to-height ratio of the CU obtained by dividing the CTU is obtained from the bitstream such that some division manners can be excluded based on the value range during decoding, and some division information previously used to indicate the division manners can be saved in the bitstream, thereby reducing occupied bit rates.

With reference to the first aspect, in some implementations of the first aspect, dividing the CTU into one or more CUs based on the first information and the division information includes dividing the CTU into one or more CUs based on the first information and the division information to obtain one or more to-be-processed CUs, and dividing, based on the first information and the division information, a first CU that needs to be further divided in the one or more to-be-processed CUs.

With reference to the first aspect, in some implementations of the first aspect, the division information includes at least one of a division type or a division direction, when a division direction of the first CU is unique, the division information includes a division type of the first CU and does not include the division direction of the first CU, and dividing, based on the first information and the division information, a first CU that needs to be further divided in the one or more to-be-processed CUs includes dividing the first CU based on the first information and the division type of the first CU.

With reference to the first aspect, in some implementations of the first aspect, that the division direction of the first CU is unique includes a width-to-height ratio of the first CU is equal to a first preset value, where the first preset value is a preset maximum allowed value of the width-to-height ratio of the CU obtained by dividing the CTU.

With reference to the first aspect, in some implementations of the first aspect, that the division direction of the first CU is unique includes a width-to-height ratio of the first CU is equal to a second preset value, where the second preset value is a preset minimum allowed value of the width-to-height ratio of the CU obtained by dividing the CTU.

With reference to the first aspect, in some implementations of the first aspect, that the first information is used to indicate an allowed value range of a width-to-height ratio of a CU obtained by dividing the CTU includes the first information is used to indicate the maximum allowed width-to-height ratio of the CU obtained by dividing the CTU, or is used to indicate the minimum allowed width-to-height ratio of the CU obtained by dividing the CTU, or is used to indicate the maximum allowed width-to-height ratio and the minimum allowed width-to-height ratio of the CU obtained by dividing the CTU.

Alternatively, the first information is used to indicate an allowed value range of a height-to-width ratio of the CU obtained by dividing the CTU.

Alternatively, the first information is used to indicate an allowed value range of a ratio of a long side to a short side (or a ratio of the short side to the long side) of the CU obtained by dividing the CTU.

With reference to the first aspect, in some implementations of the first aspect, before dividing the CTU into one or more CUs based on the first information and the division information, the method further includes determining that the width-to-height ratio of the CU obtained by dividing the CTU is limited by the value range indicated by the first information.

With reference to the first aspect, in some implementations of the first aspect, the method further includes obtaining first flag information from the bitstream, where the first flag information includes a first flag bit, and determining that a value range of the width-to-height ratio of the CU obtained by dividing the CTU is unlimited when a value of the first flag bit is a first value, or determining that the width-to-height ratio of the CU obtained by dividing the CTU is limited by the value range indicated by the first information when a value of the first flag bit is a second value. Determining that the width-to-height ratio of the CU obtained by dividing the CTU is limited by the value range indicated by the first information includes determining, based on a value of the first flag bit, whether the CU obtained by dividing the CTU is limited by the value range indicated by the first information.

With reference to the first aspect, in some implementations of the first aspect, the first information includes a second flag bit, and a value range of the width-to-height ratio of the CU obtained by dividing the CTU is unlimited when a value of the second flag bit is a third value, or a value range of the width-to-height ratio of the CU obtained by dividing the CTU is a preset first value range when a value of the second flag bit is a fourth value.

With reference to the first aspect, in some implementations of the first aspect, the first information is carried in any one of a sequence parameter set, a picture parameter set, a slice header, or a slice segment header in the bitstream.

According to a second aspect, an encoding method is provided. The method includes obtaining first information of a CTU in a to-be-encoded picture, where the first information is used to indicate an allowed value range of a width-to-height ratio of a CU obtained by dividing the CTU, determining a target division manner for the CTU from a plurality of available division manners, where a width-to-height ratio of a CU obtained by dividing the CTU in the plurality of available division manners falls within the value range indicated by the first information, dividing the CTU in the target division manner to obtain one or more CUs, where the plurality of CUs do not overlap each other, and encoding the one or more CUs to obtain a bitstream.

In this application, during encoding of the CTU, the target division manner for the CTU can be determined from the plurality of division manners that meet a requirement of the value range indicated by the first information such that some division manners can be prevented from being used to divide the CTU during encoding, thereby simplifying a process of determining the target division manner and reducing encoding complexity.

With reference to the second aspect, in some implementations of the second aspect, determining a target division manner for the CTU from a plurality of available division manners includes determining the target division manner for the CTU from the plurality of available division manners according to a rate-distortion optimization algorithm.

With reference to the second aspect, in some implementations of the second aspect, the method further includes determining division information of the CTU, where the division information is used to indicate the target division manner, and writing the division information into the bitstream.

With reference to the second aspect, in some implementations of the second aspect, the division information includes at least one of a division type or a division direction, when a division direction of a first CU that needs to be further divided in one or more to-be-processed CUs is unique, the division information includes a division type of the first CU and does not include the division direction of the first CU, and the one or more to-be-processed CUs are obtained by dividing the CTU.

With reference to the second aspect, in some implementations of the second aspect, that the division direction of the first CU is unique includes that a width-to-height ratio of the first CU is equal to a first preset value, where the first preset value is a preset maximum allowed value of the width-to-height ratio of the CU obtained by dividing the CTU.

With reference to the second aspect, in some implementations of the second aspect, that the division direction of the first CU is unique includes a width-to-height ratio of the first CU is equal to a second preset value, where the second preset value is a preset minimum allowed value of the width-to-height ratio of the CU obtained by dividing the CTU.

With reference to the second aspect, in some implementations of the second aspect, that the first information is used to indicate an allowed value range of a width-to-height ratio of a CU obtained by dividing the CTU includes that the first information is used to indicate the maximum allowed width-to-height ratio of the CU obtained by dividing the CTU, or is used to indicate the minimum allowed width-to-height ratio of the CU obtained by dividing the CTU, or is used to indicate the maximum allowed width-to-height ratio and the minimum allowed width-to-height ratio of the CU obtained by dividing the CTU.

Alternatively, the first information may be used to indicate an allowed value range of a height-to-width ratio of the CU obtained by dividing the CTU.

Further, the first information may be used to indicate a maximum allowed height-to-width ratio of the CU obtained by dividing the CTU, or may be used to indicate a minimum allowed height-to-width ratio of the CU obtained by dividing the CTU, or may be used to indicate a maximum allowed height-to-width ratio and a minimum allowed height-to-width ratio of the CU obtained by dividing the CTU.

Alternatively, the first information may indicate an allowed value range of a ratio of a long side to a short side of the CU obtained by dividing the CTU, and whether the width-to-height ratio or the height-to-width ratio indicated is not considered. Further, the first information may be used to indicate a maximum allowed long-side-to-short-side ratio of the CU obtained by dividing the CTU.

With reference to the second aspect, in some implementations of the second aspect, the method further includes determining that the width-to-height ratio of the CU obtained by dividing the CTU is limited by the value range indicated by the first information, and writing first flag information into the bitstream, where the first flag information includes a first flag bit, and determining that a value range of the width-to-height ratio of the CU obtained by dividing the CTU is unlimited when a value of the first flag bit is a first value, or determining that the width-to-height ratio of the CU obtained by dividing the CTU is limited by the value range indicated by the first information when a value of the first flag bit is a second value.

With reference to the second aspect, in some implementations of the second aspect, the first information includes a second flag bit, and a value range of the width-to-height ratio of the CU obtained by dividing the CTU is unlimited when a value of the second flag bit is a third value, or a value range of the width-to-height ratio of the CU obtained by dividing the CTU is a preset first value range when a value of the second flag bit is a fourth value.

With reference to the second aspect, in some implementations of the second aspect, the first information is carried in any one of a sequence parameter set, a picture parameter set, a slice header, or a slice segment header that is in the bitstream and that is corresponding to the to-be-encoded picture.

According to a third aspect, a decoding method is provided. The method includes obtaining first information of a CTU in a to-be-decoded picture from a bitstream, where the first information is used to indicate an allowed value range of a width-to-height ratio of at least one CU that is at a quadtree depth and that is obtained by dividing the CTU, and the at least one CU at the quadtree depth is a CU obtained by dividing the CTU according to a quadtree division type, obtaining division information of the CTU from the bitstream, dividing the CTU into one or more CUs based on the first information and the division information, where the width-to-height ratio of the at least one CU that is at the quadtree depth and that is obtained by dividing the CTU falls within the value range indicated by the first information, and decoding the one or more CUs to obtain a reconstructed pixel of the one or more CUs.

In this application, the allowed value range of the width-to-height ratio of the CU obtained by dividing the CTU is obtained from the bitstream such that some division manners can be excluded based on the value range during decoding, and some division information previously used to indicate the division manners can be saved in the bitstream, thereby reducing occupied bit rates.

With reference to the third aspect, in some implementations of the third aspect, dividing the CTU into one or more CUs based on the first information and the division information includes dividing the CTU into one or more CUs based on the first information and the division information, to obtain the at least one CU at the quadtree depth, and dividing, based on the first information and the division information, a first CU that needs to be further divided in the at least one CU at the quadtree depth.

With reference to the third aspect, in some implementations of the third aspect, the division information includes at least one of a division type or a division direction, when a division direction of the first CU is unique, the division information includes a division type of the first CU and does not include the division direction of the first CU, and dividing, based on the first information and the division information, a first CU that needs to be further divided in the at least one CU at the quadtree depth includes dividing the first CU based on the first information and the division type of the first CU.

With reference to the third aspect, in some implementations of the third aspect, that the division direction of the first CU is unique includes a width-to-height ratio of the first CU is equal to a first preset value, where the first preset value is a preset maximum allowed value of the width-to-height ratio of the CU obtained by dividing the CTU.

With reference to the third aspect, in some implementations of the third aspect, that the division direction of the first CU is unique includes a width-to-height ratio of the first CU is equal to a second preset value, where the second preset value is a preset minimum allowed value of the width-to-height ratio of the CU obtained by dividing the CTU.

With reference to the third aspect, in some implementations of the third aspect, that the first information is used to indicate an allowed value range of a width-to-height ratio of at least one CU that is at a quadtree depth and that is obtained by dividing the CTU includes that the first information is used to indicate the maximum allowed width-to-height ratio of the at least one CU that is at the quadtree depth and that is obtained by dividing the CTU, or is used to indicate the minimum allowed width-to-height ratio of the at least one CU that is at the quadtree depth and that is obtained by dividing the CTU, or is used to indicate the maximum allowed width-to-height ratio and the minimum allowed width-to-height ratio of the at least one CU that is at the quadtree depth and that is obtained by dividing the CTU.

Alternatively, the first information may be used to indicate an allowed value range of a height-to-width ratio of the at least one CU that is at the quadtree depth and that is obtained by dividing the CTU.

Alternatively, the first information may be used to indicate an allowed value range of a ratio of a long side to a short side (or a ratio of the short side to the long side) of the at least one CU that is at the quadtree depth and that is obtained by dividing the CTU.

With reference to the third aspect, in some implementations of the third aspect, before dividing the CTU into one or more CUs based on the first information and the division information, the method further includes determining that the width-to-height ratio of the at least one CU that is at the quadtree depth and that is obtained by dividing the CTU is limited by the value range indicated by the first information.

With reference to the third aspect, in some implementations of the third aspect, the method further includes obtaining first flag information from the bitstream, where the first flag information includes a first flag bit, and determining that a value range of the width-to-height ratio of the at least one CU that is at the quadtree depth and that is obtained by dividing the CTU is unlimited when a value of the first flag bit is a first value, or determining that the width-to-height ratio of the at least one CU that is at the quadtree depth and that is obtained by dividing the CTU is limited by the value range indicated by the first information when a value of the first flag bit is a second value. Determining that the width-to-height ratio of the at least one CU that is at the quadtree depth and that is obtained by dividing the CTU is limited by the value range indicated by the first information includes determining, based on a value of the first flag bit, that the width-to-height ratio of the at least one CU that is at the quadtree depth and that is obtained by dividing the CTU is limited by the value range indicated by the first information.

With reference to the third aspect, in some implementations of the third aspect, the first information includes a second flag bit, and a value range of the width-to-height ratio of the at least one CU that is at the quadtree depth and that is obtained by dividing the CTU is unlimited when a value of the second flag bit is a third value, or a value range of the width-to-height ratio of the at least one CU that is at the quadtree depth and that is obtained by dividing the CTU is a preset first value range when a value of the second flag bit is a fourth value.

With reference to the third aspect, in some implementations of the third aspect, the first information is carried in any one of a sequence parameter set, a picture parameter set, a slice header, or a slice segment header in the bitstream.

With reference to the third aspect, in some implementations of the third aspect, the first information includes a plurality of pieces of sub-information, and any one of the plurality of pieces of sub-information is used to indicate an allowed value range of a width-to-height ratio of a CU obtained by dividing the at least one CU at the QT depth.

According to a fourth aspect, an encoding method is provided. The method includes obtaining first information of a CTU in a to-be-encoded picture, where the first information is used to indicate an allowed value range of a width-to-height ratio of at least one CU that is at a quadtree depth and that is obtained by dividing the CTU, and the at least one CU at the quadtree depth is a CU obtained by dividing the CTU according to a quadtree division type, determining a target division manner for the CTU from a plurality of available division manners, where a width-to-height ratio of a CU obtained by dividing the CTU in the plurality of available division manners falls within the value range indicated by the first information, dividing the CTU in the target division manner to obtain one or more CUs, where the plurality of CUs do not overlap each other, and encoding the one or more CUs to obtain a bitstream.

In this application, during encoding of the CTU, the target division manner for the CTU can be determined from the plurality of division manners that meet a requirement of the value range indicated by the first information such that some division manners can be prevented from being used to divide the CTU during encoding, thereby simplifying a process of determining the target division manner and reducing encoding complexity.

With reference to the fourth aspect, in some implementations of the fourth aspect, determining a target division manner for the CTU from a plurality of available division manners includes determining the target division manner for the CTU from the plurality of available division manners according to a rate-distortion optimization algorithm.

With reference to the fourth aspect, in some implementations of the fourth aspect, the method further includes determining division information of the CTU, where the division information is used to indicate the target division manner, and writing the division information into the bitstream.

With reference to the fourth aspect, in some implementations of the fourth aspect, the division information includes at least one of a division type or a division direction, and when a division direction of a first CU that needs to be further divided in the at least one CU at the quadtree depth is unique, the division information includes a division type of the first CU and does not include the division direction of the first CU.

With reference to the fourth aspect, in some implementations of the fourth aspect, that the division direction of the first CU is unique includes that a width-to-height ratio of the first CU is equal to a first preset value, where the first preset value is a preset maximum allowed value of the width-to-height ratio of the CU obtained by dividing the CTU.

With reference to the fourth aspect, in some implementations of the fourth aspect, that the division direction of the first CU is unique includes that a width-to-height ratio of the first CU is equal to a second preset value, where the second preset value is a preset minimum allowed value of the width-to-height ratio of the CU obtained by dividing the CTU.

With reference to the fourth aspect, in some implementations of the fourth aspect, that the first information is used to indicate an allowed value range of a width-to-height ratio of at least one CU that is at a quadtree depth and that is obtained by dividing the CTU includes that the first information is used to indicate the maximum allowed width-to-height ratio of the at least one CU that is at the quadtree depth and that is obtained by dividing the CTU, or is used to indicate the minimum allowed width-to-height ratio of the at least one CU that is at the quadtree depth and that is obtained by dividing the CTU, or is used to indicate the maximum allowed width-to-height ratio and the minimum allowed width-to-height ratio of the at least one CU that is at the quadtree depth and that is obtained by dividing the CTU.

Alternatively, the first information may be used to indicate an allowed value range of a height-to-width ratio of the at least one CU that is at the quadtree depth and that is obtained by dividing the CTU.

Alternatively, the first information may be used to indicate an allowed value range of a ratio of a long side to a short side (or a ratio of the short side to the long side) of the at least one CU that is at the quadtree depth and that is obtained by dividing the CTU.

With reference to the fourth aspect, in some implementations of the fourth aspect, the method further includes determining that the width-to-height ratio of the at least one CU that is at the quadtree depth and that is obtained by dividing the CTU is limited by the value range indicated by the first information, and writing first flag information into the bitstream, where the first flag information includes a first flag bit, and determining that a value range of the width-to-height ratio of the at least one CU that is at the quadtree depth and that is obtained by dividing the CTU is unlimited when a value of the first flag bit is a first value, or determining that the width-to-height ratio of the at least one CU that is at the quadtree depth and that is obtained by dividing the CTU is limited by the value range indicated by the first information when a value of the first flag bit is a second value.

With reference to the fourth aspect, in some implementations of the fourth aspect, the first information includes a second flag bit, and a value range of the width-to-height ratio of the at least one CU that is at the quadtree depth and that is obtained by dividing the CTU is unlimited when a value of the second flag bit is a third value, or a value range of the width-to-height ratio of the at least one CU that is at the quadtree depth and that is obtained by dividing the CTU is a preset first value range when a value of the second flag bit is a fourth value.

With reference to the fourth aspect, in some implementations of the fourth aspect, the first information is carried in any one of a sequence parameter set, a picture parameter set, a slice header, or a slice segment header that is in the bitstream and that is corresponding to the to-be-encoded picture.

With reference to the fourth aspect, in some implementations of the fourth aspect, the first information includes a plurality of pieces of sub-information, and any one of the plurality of pieces of sub-information is used to indicate an allowed value range of a width-to-height ratio of a CU obtained by dividing the at least one CU at the QT depth.

According to a fifth aspect, a decoder is provided, where the decoder includes a module configured to perform the method according to any one of the first aspect or the implementations of the first aspect.

According to a sixth aspect, an encoder is provided, where the encoder includes a module configured to perform the method according to any one of the second aspect or the implementations of the second aspect.

According to a seventh aspect, a decoder is provided, where the decoder includes a module configured to perform the method according to any one of the third aspect or the implementations of the third aspect.

According to an eighth aspect, an encoder is provided, where the encoder includes a module configured to perform the method according to any one of the fourth aspect or the implementations of the fourth aspect.

According to a ninth aspect, a decoder is provided, including a non-volatile storage medium and a central processing unit, where the non-volatile storage medium stores an executable program, and the central processing unit is connected to the non-volatile storage medium, and executes the executable program to implement the method according to the first aspect.

According to a tenth aspect, an encoder is provided, including a non-volatile storage medium and a central processing unit, where the non-volatile storage medium stores an executable program, and the central processing unit is connected to the non-volatile storage medium, and executes the executable program to implement the method according to the second aspect.

According to an eleventh aspect, a decoder is provided, including a non-volatile storage medium and a central processing unit, where the non-volatile storage medium stores an executable program, and the central processing unit is connected to the non-volatile storage medium, and executes the executable program to implement the method according to the third aspect.

According to a twelfth aspect, an encoder is provided, including a non-volatile storage medium and a central processing unit, where the non-volatile storage medium stores an executable program, and the central processing unit is connected to the non-volatile storage medium, and executes the executable program to implement the method according to the fourth aspect.

According to a thirteenth aspect, a computer readable medium is provided, where the computer readable medium stores program code to be executed by a device, and the program code includes an instruction used to perform the method according to the first aspect.

According to a fourteenth aspect, a computer readable medium is provided, where the computer readable medium stores program code to be executed by a device, and the program code includes an instruction used to perform the method according to the second aspect.

According to a fifteenth aspect, a computer readable medium is provided, where the computer readable medium stores program code to be executed by a device, and the program code includes an instruction used to perform the method according to the third aspect.

According to a sixteenth aspect, a computer readable medium is provided, where the computer readable medium stores program code to be executed by a device, and the program code includes an instruction used to perform the method according to the fourth aspect.

DESCRIPTION OF EMBODIMENTS

The following describes the technical solutions in the embodiments of this application with reference to the accompanying drawings in the embodiments of this application.

For better understanding of an encoding method, a decoding method, an encoder, and a decoder in the embodiments of this application, the following first briefly describes related concepts in encoding and decoding processes.

When encoding a picture, an encoder side device may divide the picture into a plurality of CTUs. The CTU is usually an N×N square area (namely, a rectangular pixel matrix including N×N pixels), and dimensions of the CTU are usually 64×64 in the H.265 video coding standard.

In addition, the CTU may be further divided into a plurality of CUs. Each CU is an A×B rectangular area. A is a width of the rectangle, B is a height of the rectangle, and A and B may be the same or different.

Generally, a value of each of A and B is 2 raised to an integral power. For example, each of A and B may be 4, 8, 16, 32, 64, 128, or the like.

During division of the CTU, the CTU may be divided according to a plurality of division types. The following briefly describes the division types with reference to FIG. 1 to FIG. 5.

Figure 1:
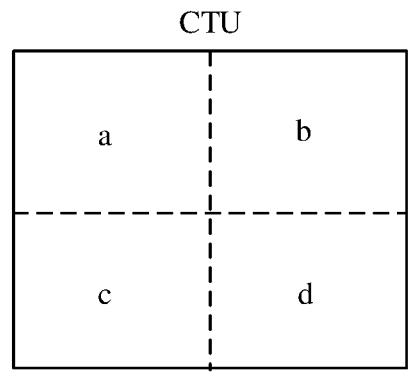
FIG. 1 is a schematic diagram of a CU obtained by dividing a CTU.

Quadtree: The quadtree is a tree-like structure, and one node can be divided into four subnodes. As shown in FIG. 1, the CTU is divided according to a quadtree division type to obtain four CUs of same dimensions, namely, a, b, c, and d.

Figure 2:
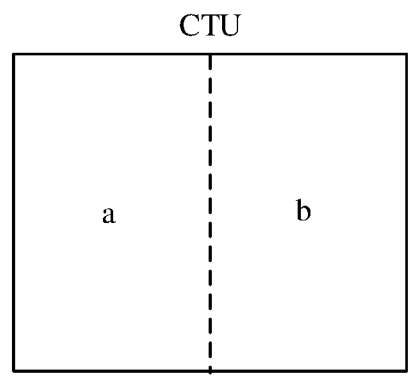
FIG. 2 is a schematic diagram of a CU obtained by dividing a CTU.
Figure 3:
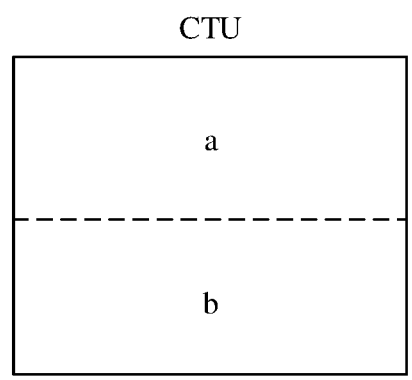
FIG. 3 is a schematic diagram of a CU obtained by dividing a CTU.

Binary tree: The binary tree is also a tree-like structure, and one node can be divided into two subnodes. As shown in FIG. 2, the CTU may be divided into two CUs, namely, a on the left and b on the right, in a vertical direction according to a binary tree division type. In addition, as shown in FIG. 3, the CTU may alternatively be divided into a on an upper part and b on a lower part in a horizontal direction according to the binary tree division type.

Figure 4:
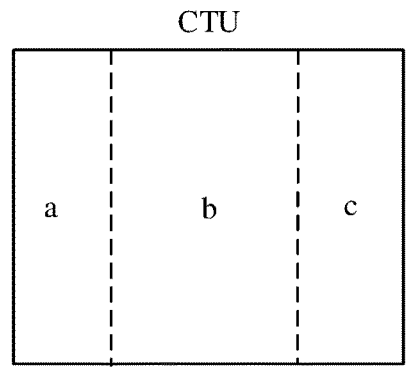
FIG. 4 is a schematic diagram of a CU obtained by dividing a CTU.
Figure 5:
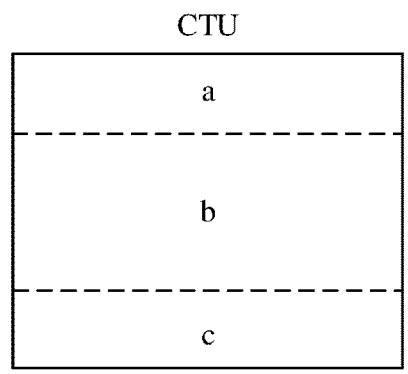
FIG. 5 is a schematic diagram of a CU obtained by dividing a CTU.

Ternary tree: The ternary tree is a relatively special tree-like structure, and one node can be divided into three subnodes. As shown in FIG. 4, the CTU is divided into a total of three CUs, namely, a on the left, c on the right, and b in the middle, in a vertical direction according to a ternary tree division type. Dimensions of a are the same as those of c, and the dimensions of a are half dimensions of b. In addition, the CTU may alternatively be divided in a horizontal direction according to the ternary tree division type. As shown in FIG. 5, the CTU is divided into a total of three CUs, namely, a on an upper part, b in the middle, and c on a lower part, in the horizontal direction according to the ternary tree division type. Dimensions of a are the same as that of c, and the dimensions of a are half dimensions of b.

Figure 6:
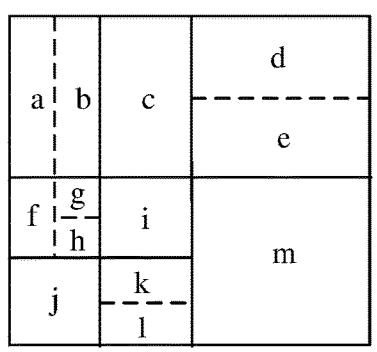
FIG. 6 is a schematic diagram of a CU obtained by dividing a CTU.
Figure 6:
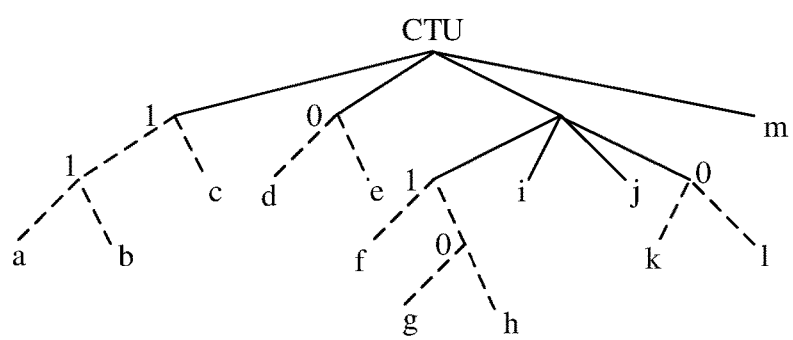

One CTU may be divided into a plurality of CUs, and any one or more of the CUs may be further divided to obtain a smaller CU. For example, as shown in FIG. 6, a 64×64 CTU may be first divided into four 32×32 CUs according to the quadtree division type. A CU on a lower right part in the four 32×32 CUs is not further divided, but the other CUs are further divided. A CU on an upper left part is first divided into two parts in a vertical direction according to the binary tree division type, and then a CU on the left is further divided into a and b according to the binary tree division type. A CU on an upper right part is divided into d and e in a horizontal direction according to the binary tree division type. A CU on a lower left part is first divided into four CUs of same dimensions according to the quadtree division type, and then a CU on an upper left part and a CU on a lower right part are further divided to finally obtain f, g, h, i, j, k, and l.

FIG. 6 shows a final division manner of dividing a CTU into a plurality of CUs. When dividing a CTU, an encoder needs to attempt various possible division types (the quadtree, the binary tree, and the ternary tree) and division directions (the horizontal direction and the vertical direction) for each CTU that needs to be divided, calculates, according to a rate-distortion optimization algorithm, rate-distortion costs for dividing the CTU into a plurality of CUs in various division manners, and selects a division manner corresponding to a lowest rate-distortion cost, for dividing the CTU. The encoder needs to attempt various possible division types and division directions during CU division, and consequently calculation complexity of the encoder is increased and encoding efficiency is reduced.

It is learned through statistical analysis that, if a CTU is divided in a relatively preferable division manner that is selected according to the rate-distortion optimization algorithm, a CU with a larger ratio of a long side to a short side (or a larger width-to-height ratio or a larger height-to-width ratio) in the CTU occupies a smaller proportion in the CTU. A ratio of a long side to a short side of a CU obtained by dividing the CTU in the relatively preferable division manner is less than a specific threshold, and a division manner that causes an excessively large ratio of a long side to a short side of a CU may be directly excluded during determining of a preferable division manner. Therefore, in the embodiments of this application, an allowed value range of a ratio of a long side to a short side of a CU obtained by dividing a CTU may be set to reduce calculation complexity of selecting a CTU division manner by an encoder and improve encoding efficiency. The following describes in detail a decoding method in the embodiments of this application with reference to FIG. 7.

Figure 7:
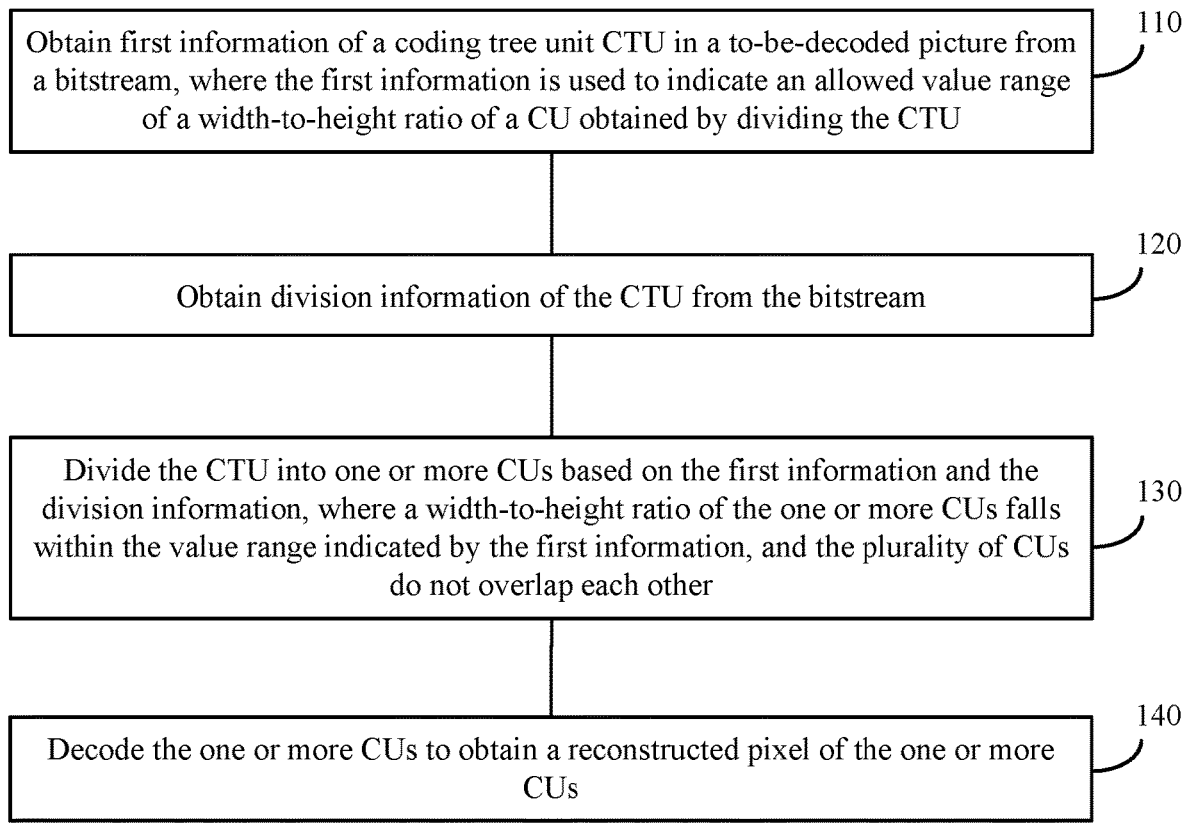
FIG. 7 is a schematic flowchart of a decoding method according to an embodiment of this application.

FIG. 7 is a schematic flowchart of a decoding method according to an embodiment of this application. The method in FIG. 7 may be performed by a decoder side device, a decoder, or another device with a decoding function. The method in FIG. 7 includes the following steps.

Step 110. Obtain first information of a CTU in a to-be-decoded picture from a bitstream, where the first information is used to indicate an allowed value range of a width-to-height ratio of a CU obtained by dividing the CTU.

The ratio of a width to a height of the CU may be briefly referred to as a "width-to-height ratio" of the CU. The width-to-height ratio of the CU may be a ratio of a value of the width to a value of the height of the CU. The values of the width and the height may be represented by pixels. For example, values of a width and a height of a CU are respectively 32 pixels and 16 pixels (in this case, a width-to-height ratio of the CU is 2).

Optionally, the CTU may be one specific CTU in the to-be-decoded picture, and in this case, the first information is used to indicate an allowed value range of a width-to-height ratio of a CU obtained by dividing the specific CTU. Alternatively, the CTU may be a plurality of CTUs in the to-be-decoded picture, and in this case, the first information is used to indicate an allowed value range of a width-to-height ratio of a CU obtained by dividing the plurality of CTUs. The first information may indicate an allowed value range of a width-to-height ratio of a CU obtained by dividing one CTU, or may indicate an allowed value range of a width-to-height ratio of a CU obtained by dividing a plurality of CTUs.

Optionally, the first information is used to indicate a maximum allowed width-to-height ratio of the CU obtained by dividing the CTU, or is used to indicate a minimum allowed width-to-height ratio of the CU obtained by dividing the CTU, or is used to indicate a maximum allowed width-to-height ratio and a minimum allowed width-to-height ratio of the CU obtained by dividing the CTU. The maximum width-to-height ratio is a maximum allowed width-to-height ratio of the CU obtained by dividing the CTU, and the minimum width-to-height ratio is a minimum allowed width-to-height ratio of the CU obtained by dividing the CTU.

Alternatively, the first information may be used to indicate an allowed value range of a height-to-width ratio of the CU obtained by dividing the CTU.

Further, the first information may be used to indicate a maximum allowed height-to-width ratio of the CU obtained by dividing the CTU, or may be used to indicate a minimum allowed height-to-width ratio of the CU obtained by dividing the CTU, or may be used to indicate a maximum allowed height-to-width ratio and a minimum allowed height-to-width ratio of the CU obtained by dividing the CTU.

Alternatively, the first information may indicate an allowed value range of a ratio of a long side to a short side (or a ratio of the short side to the long side) of the CU obtained by dividing the CTU, and whether the width-to-height ratio or the height-to-width ratio is further indicated is not considered. Further, the first information may be used to indicate a maximum allowed long-side-to-short-side ratio of the CU obtained by dividing the CTU.

In some feasible implementations, alternatively, the first information may be a value range of the height or the width of the CU. For example, an allowed height of the CU is 1/N of a height of the CTU, where N is a preset integer, an allowed width of the CU is 1/M of a width of the CTU, where M is a preset integer.

The bitstream may be a bitstream generated after an encoding side device or an encoder encodes a to-be-encoded picture.

The first information may be carried in any one of a sequence parameter set (also referred to as SPS), a picture parameter set (also referred to as PPS), a slice header, or a slice segment header in the bitstream. For example, when the first information is included in the sequence parameter set, first information in a sequence parameter set corresponding to the to-be-decoded picture is used as first information of all CTUs in the to-be-decoded picture, or first information in a picture parameter set corresponding to the to-be-decoded picture is used as first information of all CTUs in the to-be-decoded picture when the first information is included in the picture parameter set, first information in a slice header corresponding to each slice in the to-be-decoded picture is used as first information of all CTUs in the slice when the first information is included in the slice header, or first information in a slice segment header corresponding to each slice segment in the to-be-decoded picture is used as first information of all CTUs in the slice segment when the first information is included in the slice segment header.

Step 120. Obtain division information of the CTU from the bitstream.

Step 130. Divide the CTU into one or more CUs based on the first information and the division information, where a width-to-height ratio of the one or more CUs falls within the value range indicated by the first information, and the plurality of CUs do not overlap each other.

Optionally, dividing the CTU into one or more CUs based on the first information and the division information may include dividing the CTU into one or more CUs based on the first information and the division information to obtain one or more to-be-processed CUs, and dividing, based on the first information and the division information, a first CU that needs to be further divided in the one or more to-be-processed CUs.

During division of the CTU, the CTU may be first divided at least once to obtain to-be-processed CUs. The to-be-processed CUs are CUs that do not overlap each other and that are obtained by dividing the CTU, and the to-be-processed CUs may include a CU that needs to be further divided, and may also include a CU that does not need to be further divided. The first CU is a CU that needs to be further divided in the to-be-processed CUs.

Optionally, the division information may include at least one of a division type or a division direction. When a division direction of the first CU is unique, the division information includes only a division type of the first CU and does not include the division direction of the first CU. When the division direction of the first CU is unique, dividing, based on the first information and the division information, a first CU that needs to be further divided in the one or more to-be-processed CUs includes dividing the first CU based on the first information and the division type of the first CU.

When a division direction of a CU that needs to be further divided in the to-be-processed CUs is unique, the division information may indicate only a division type of the CU without indicating the division direction of the CU. In this way, bits occupied by the division information are reduced, thereby reducing occupied bit rates.

It should be understood that the division information may include division information of each to-be-determined CU in the CTU.

The division type may include at least two of non-division, a quadtree division type, a binary tree division type, and a ternary tree division type, and the division direction may include a horizontal direction and a vertical direction. It should be understood that the division type herein indicates whether division needs to be performed or which division type is to be used, but does not indicate whether division is to be performed in the horizontal direction or the vertical direction. In addition, the horizontal direction herein may be a direction parallel to the width of the CU, and the vertical direction may be a direction parallel to the height of the CU. The quadtree division type is relatively special and there is no division direction. Therefore, when a division type of a CU is the quadtree division type, division information of the CU indicates only whether the CU is to be further divided according to the quadtree division type, without indicating a division direction.

That the division direction of the first CU is unique may include the following several cases.

(1) A width-to-height ratio of the first CU is equal to a first preset value.

The first preset value may be a maximum width-to-height ratio, namely, a maximum allowed value, indicated by the first information, of the width-to-height ratio of the CU. For example, the width-to-height ratio of the first CU is 4, the maximum width-to-height ratio is also 4, and an available division type of the CTU includes only the binary tree division type and/or the ternary tree division type. In this case, during division of the first CU, the first CU can be divided only in the vertical direction regardless of whether the binary tree division type or the ternary tree division type is used, and cannot be divided in the horizontal direction (because the width-to-height ratio further increases if division is performed in the horizontal direction). Therefore, the division information of the first CU does not need to include the division direction.

(2) A width-to-height ratio of the first CU is equal to a second preset value.

The second preset value may be a minimum width-to-height ratio, namely, a minimum allowed value, indicated by the first information, of the width-to-height ratio of the CU. For example, the width-to-height ratio of the first CU is ¼, and the minimum width-to-height ratio is also ¼, and a division type of the CTU includes only the binary tree division type and/or the ternary tree division type. In this case, similarly, during division of the first CU, the first CU can be divided only in the horizontal direction regardless of which division type is used. Therefore, the division information of the first CU does not need to include the division direction either.

The width-to-height ratio is used as an example in (1) and (2) to indicate that the division direction of the first CU is unique. Actually, a height-to-width ratio may alternatively be used to indicate that the division direction of the first CU is unique. A specific indication manner is similar, and for brevity, details are not described herein again.

The following describes in detail the foregoing two cases (1) and (2) with reference to specific examples.

Example 1

Available division types of a first CTU include the binary tree division type and the quadtree division type. During division of the first CTU, the first CTU is first divided into at least one leaf node CU according to the quadtree division type, and the quadtree leaf node CU may be further divided according to the binary tree division type or may not be divided. The first CU is a CU that may be further divided in a binary tree (to be specific, a binary tree depth (BT depth) of the first CU is less than a largest binary tree depth, and a long side of the first CU is longer than a shortest CU side). When the width-to-height ratio of the first CU is equal to the maximum width-to-height ratio, if the first CU is divided according to the binary tree division type, the first CU can be divided only in the vertical direction, and the division information does not include the division direction of the first CU. When the width-to-height ratio of the first CU is equal to the minimum width-to-height ratio, if the first CU is divided according to the binary tree division type, the first CU can be divided only in the horizontal direction, and the division information does not include the division direction of the first CU.

Example 2

A first CTU is first divided into at least one leaf node CU according to the quadtree division type, and the quadtree leaf node CU may be further divided according to the binary tree division type or the ternary tree division type, or may not be divided. The first CU is a CU that may be further divided in a binary tree (to be specific, a binary tree, a binary tree depth and a ternary tree depth (TT depth) of the first CU are less than a largest binary tree depth and a largest ternary tree depth, a long side of the first CU is longer than a shortest CU side, and that a binary tree depth and a ternary tree depth of a CU are N indicates that the CU is obtained by performing N times of binary tree division or ternary tree division on a quadtree leaf node CU). When the width-to-height ratio of the first CU is equal to the maximum width-to-height ratio, if the first CU is further divided according to the binary tree division type or the ternary tree division type, the first CU can be divided only in the vertical direction, and the division information of the first CU does not include the division direction of the first CU. When the width-to-height ratio of the first CU is equal to the minimum width-to-height ratio, if the first CU is divided according to the binary tree division type or the ternary tree division type, the first CU can be divided only in the horizontal direction, and the division information of the first CU does not include the division direction of the first CU either.

Optionally, when the width-to-height ratio of the first CU is less than the maximum width-to-height ratio and greater than the minimum width-to-height ratio, the division information of the first CU includes the division type and the division direction of the first CU.

In some cases, when the division direction of the first CU cannot be uniquely determined based on the first information, the division information of the first CU needs to include not only the division type of the first CU but also the division direction of the first CU.

It should be understood that the determining the plurality of CUs included in the CTU based on the division information and the first information may be determining, based on the division information and the first information, a target division manner of finally dividing the CTU into the plurality of CUs, and dividing the CTU in the target division manner to obtain the plurality of final CUs.

Step 140. Decode the one or more CUs to obtain a reconstructed pixel of the one or more CUs.

CU decoding includes processing such as entropy decoding, dequantization, inverse transform, prediction, and loop filtering.

In this application, the allowed value range of the width-to-height ratio of the CU obtained by dividing the CTU is obtained from the bitstream such that some division manners can be excluded based on the value range during decoding, and some division information previously used to indicate the division manners can be saved in the bitstream, thereby reducing occupied bit rates.

Optionally, the method in FIG. 7 further includes determining whether the width-to-height ratio of the CU obtained by dividing the CTU is limited by the value range indicated by the first information.

Optionally, the method in FIG. 7 further includes obtaining first flag information from the bitstream, where the first flag information includes a first flag bit, and a value range of the width-to-height ratio of the CU obtained by dividing the CTU is unlimited when a value of the first flag bit is a first value, or the width-to-height ratio of the CU obtained by dividing the CTU is limited by the value range indicated by the first information when a value of the first flag bit is a second value. Determining whether the width-to-height ratio of the CU obtained by dividing the CTU is limited by the value range indicated by the first information includes determining, based on a value of the first flag bit, whether the CU obtained by dividing the CTU is limited by the value range indicated by the first information.

It should be understood that, that the value range of the width-to-height ratio of the CU obtained by dividing the CTU is unlimited may be that the value range of the width-to-height ratio of the CU obtained through division falls between a maximum width-to-height ratio that is large enough and a minimum width-to-height ratio that is small enough. The maximum width-to-height ratio and the minimum width-to-height ratio may be preconfigured.

To be specific, when the bitstream includes the first flag information, a value of the first flag bit in the first flag information needs to be first determined, and then, whether to parse the first information needs to be determined based on the value of the first flag bit. If a value of the first flag bit is the first value (for example, 0), the value range of the width-to-height ratio of the CU does not need to be considered during division of the CTU. Therefore, the first information does not need to be parsed. When a value of the first flag bit is the second value (for example, 1), the value range of the width-to-height ratio of the CU needs to be considered during division of the CTU. In this case, the first information needs to be parsed to determine the allowed value range of the width-to-height ratio of the CU obtained by dividing the CTU.

Alternatively, the first information may include only a second flag bit. When a value of the second flag bit is a third value, a value range of the width-to-height ratio of the CU obtained by dividing the CTU is unlimited, or when a value of the second flag bit is a fourth value, a value range of the width-to-height ratio of the CU obtained by dividing the CTU is a preset first value range. The first value range may be a preset default value range. The third value and the fourth value may be respectively 0 and 1, or 1 and 0.

For example, when the second flag bit is 0, the width-to-height ratio of the CU obtained by dividing the CTU is unlimited. When the second flag bit is 1, the range of the width-to-height ratio of the CU obtained by dividing the CTU is [¼, 4] (that is, the width-to-height ratio is greater than or equal to ¼ and less than or equal to 4). In this case, the first value range is from a minimum width-to-height ratio ¼ to a maximum width-to-height ratio 4.

The bitstream described above may be the bitstream generated after the encoder or the encoding side device encodes the to-be-encoded picture.

In addition, the first information may be further represented using a syntax element, and the syntax element may be encoded using a fixed-length code or a Golomb code, and the decoder side device obtains a value of the syntax element by parsing the bitstream to obtain the first information.

An implementation in which the first information is represented by a syntax element is as follows. When a long-side-to-short-side ratio is used to indicate the allowed value range of the ratio of the long side to the short side of the CU obtained by dividing the CTU, a maximum long-side-to-short-side ratio may be obtained using a syntax element A representing the first information. For example, when values of the syntax element A are 0, 1, and 2, maximum long-side-to-short-side ratios are respectively 4, 8, and 16, when values of the syntax element A are 0, 1, and 2, maximum long-side-to-short-side ratios are respectively 16, 8, and 4, or when values of the syntax element A are 0, 1, 2, and 3, maximum long-side-to-short-side ratios are respectively 4, 8, 16, and 32. A larger difference between a long-side-to-short-side ratio and 1 indicates that a rectangle is thinner, and a smaller difference between a long-side-to-short-side ratio and 1 indicates that a rectangle is closer to a quadrate.

It should be understood that a maximum width-to-height ratio, a minimum width-to-height ratio, a maximum height-to-width ratio, a minimum height-to-width ratio, or the like may be similarly obtained using the syntax element A representing the first information herein.

Another implementation in which the first information is represented by a syntax element is as follows. When the maximum width-to-height ratio and the minimum width-to-height ratio are further used to indicate the allowed value range of the width-to-height ratio of the CU obtained by dividing the CTU, the maximum width-to-height ratio and the minimum width-to-height ratio may be obtained respectively using a syntax element A and a syntax element B that represent the first information. For example, when values of the syntax element A are 0, 1, and 2, maximum width-to-height ratios are respectively 16, 8, and 4, and when values of the syntax element B are 0, 1, and 2, minimum width-to-height ratios are respectively ¹⁄₁₆, ⅛, and ¼.

Still another implementation in which the first information is represented by a syntax element is as follows. When the maximum width-to-height ratio and the minimum width-to-height ratio are used to indicate the allowed value range of the width-to-height ratio of the CU obtained by dividing the CTU, the maximum width-to-height ratio and the minimum width-to-height ratio may be obtained using a syntax element A representing the first information. For example, a value 0 of the syntax element A indicates that the width-to-height ratio of the CU obtained by dividing the CTU is unlimited (or it may be considered that in this case, the maximum width-to-height ratio is a value that is large enough such as 64, and the minimum width-to-height ratio is a value that is small enough such as ¹⁄₆₄), a value 1 of the syntax element A indicates that the maximum width-to-height ratio is 4, and the minimum width-to-height ratio is ¼, and a value 2 of the syntax element A indicates that the maximum width-to-height ratio is 8, and the minimum width-to-height ratio is ⅛. Herein, when the value of the syntax element A is 0, the value range of the width-to-height ratio of the CU obtained by dividing the CTU is unlimited. Other values of the syntax element A correspond to different value ranges, and these value ranges may be preset.

The foregoing describes in detail the decoding method in this embodiment of this application from a perspective of the decoder side with reference to FIG. 7. The following describes an encoding method in an embodiment of this application from a perspective of an encoder side with reference to FIG. 8. It should be understood that, steps in the encoding method described below with reference to FIG. 8 correspond to the steps in the decoding method described above with reference to FIG. 7. For brevity, repeated descriptions are appropriately omitted.

Figure 8:
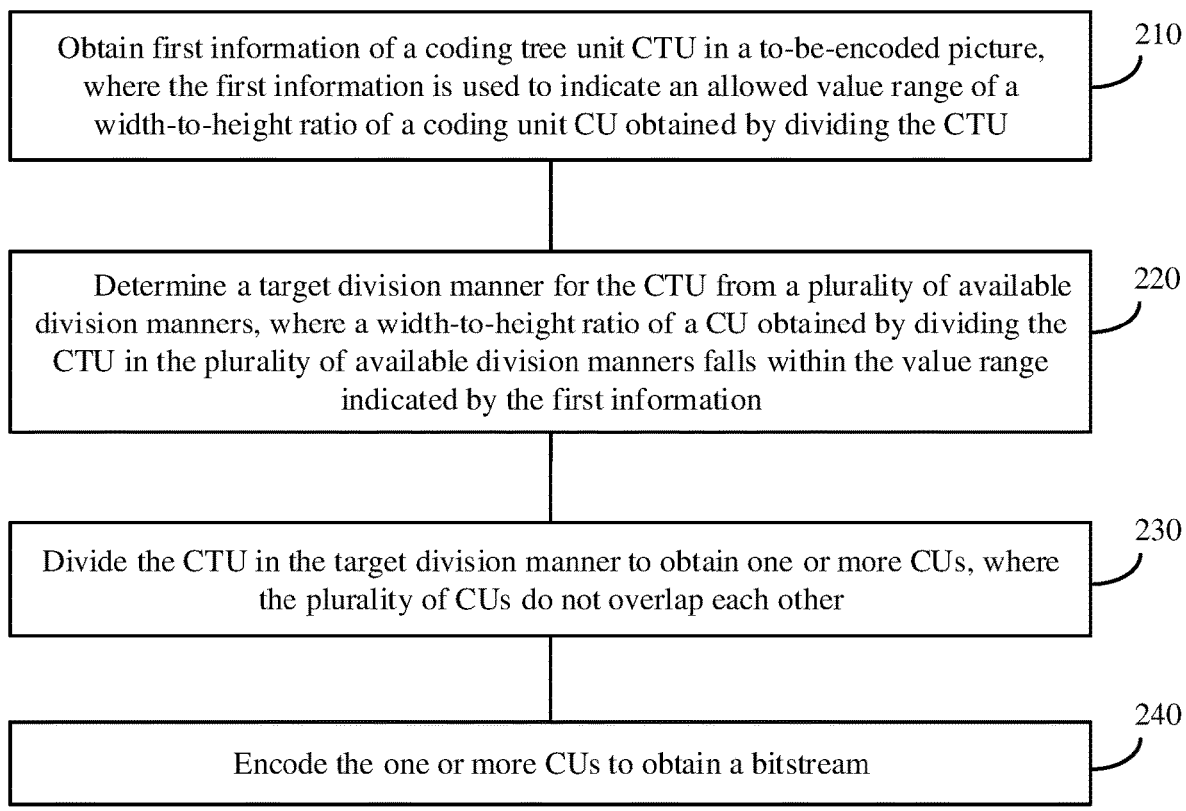
FIG. 8 is a schematic flowchart of an encoding method according to an embodiment of this application.

FIG. 8 is a schematic flowchart of an encoding method according to an embodiment of this application. The method in FIG. 8 may be performed by an encoder side device, an encoder, or another device with an encoding function. The method in FIG. 8 includes the following steps.

Step 210. Obtain first information of a CTU in a to-be-encoded picture, where the first information is used to indicate an allowed value range of a width-to-height ratio of a CU obtained by dividing the CTU.

The ratio of a width to a height of the CU may be briefly referred to as a "width-to-height ratio" of the CU.

Optionally, the first information is used to indicate a maximum allowed width-to-height ratio of the CU obtained by dividing the CTU, or is used to indicate a minimum allowed width-to-height ratio of the CU obtained by dividing the CTU, or is used to indicate a maximum allowed width-to-height ratio and a minimum allowed width-to-height ratio of the CU obtained by dividing the CTU. The maximum width-to-height ratio is a maximum allowed width-to-height ratio of the CU obtained by dividing the CTU, and the minimum width-to-height ratio is a minimum allowed width-to-height ratio of the CU obtained by dividing the CTU.

Alternatively, the first information may be used to indicate an allowed value range of a height-to-width ratio of the CU obtained by dividing the CTU.

Further, the first information may be used to indicate a maximum allowed height-to-width ratio of the CU obtained by dividing the CTU, or may be used to indicate a minimum allowed height-to-width ratio of the CU obtained by dividing the CTU, or may be used to indicate a maximum allowed height-to-width ratio and a minimum allowed height-to-width ratio of the CU obtained by dividing the CTU.

Alternatively, the first information may indicate an allowed value range of a ratio of a long side to a short side of the CU obtained by dividing the CTU, and whether the width-to-height ratio or the height-to-width ratio indicated is not considered. Further, the first information may be used to indicate a maximum allowed long-side-to-short-side ratio of the CU obtained by dividing the CTU.

Optionally, the first information may be carried in any one of a sequence parameter set, a picture parameter set, a slice header, or a slice segment header corresponding to the to-be-encoded picture.

Further, an allowed value range of a width-to-height ratio of a CU obtained by dividing a CTU in a sequence, a picture, a slice, or a slice segment may be first set (i.e., first information is first determined), and then the first information is written into any one of an SPS, a PPS, a slice header, or a slice segment header.

For example, when the first information is included in the sequence parameter set, first information in a sequence parameter set corresponding to the to-be-encoded picture is used as first information of all CTUs in the to-be-encoded picture, first information in a picture parameter set corresponding to the to-be-encoded picture is used as first information of all CTUs in the to-be-encoded picture when the first information is included in the picture parameter set, first information in a slice header corresponding to each slice in the to-be-encoded picture is used as first information of all CTUs in the slice when the first information is included in the slice header, or first information in a slice segment header corresponding to each slice segment in the to-be-encoded picture is used as first information of all CTUs in the slice segment when the first information is included in the slice segment header.

Step 220. Determine a target division manner for the CTU from a plurality of available division manners, where a width-to-height ratio of a CU obtained by dividing the CTU in the plurality of available division manners falls within the value range indicated by the first information.

Step 230. Divide the CTU in the target division manner to obtain one or more CUs, where the plurality of CUs do not overlap each other.

Each of the plurality of available division manners may be corresponding to one division tree structure, and a CTU may be divided, using the division tree structure, into a plurality of CUs that do not overlap each other. As shown in FIG. 6, a CTU is divided, using a division tree structure shown on the right of FIG. 6, into a plurality of CUs (a, b, c, d, e, f, g, h, i, j, k, l, and m) that do not overlap each other.

Optionally, determining a target division manner for the CTU from a plurality of available division manners includes determining the target division manner for the CTU from the plurality of available division manners according to a rate-distortion optimization algorithm.

Further, the CTU may be divided in the plurality of available division manners, a rate-distortion cost corresponding to each division manner is calculated according to the rate-distortion optimization algorithm, and a division manner corresponding to a lowest rate-distortion cost is selected as the target division manner for the CTU.

Because dividing the CTU in the plurality of available division manners is limited by the value range indicated by the first information, when the target division manner is determined according to the rate-distortion optimization algorithm, only a division manner that can meet a requirement of the value range indicated by the first information needs to be considered. This reduces complexity of determining the target division manner.

Step 240. Encode the one or more CUs to obtain a bitstream.

In this embodiment of this application, during encoding of the CTU, the target division manner for the CTU can be determined from the plurality of division manners that meet the requirement of the value range indicated by the first information such that some division manners can be prevented from being used to divide the CTU during encoding, thereby simplifying a process of determining the target division manner and reducing encoding complexity.

Optionally, in an embodiment, the method in FIG. 8 further includes determining division information of the CTU, where the division information is used to indicate the target division manner, and writing the division information into the bitstream.

After determining the target division manner, the encoder side writes the division information indicating the target division manner into the bitstream such that a decoder side can also divide the CTU in the target division manner during decoding.

Optionally, the division information may include at least one of a division type or a division direction. When a division direction of a first CU that needs to be further divided in one or more to-be-processed CUs is unique, the division information includes a division type of the first CU and does not include the division direction of the first CU. The one or more to-be-processed CUs are CUs that are obtained by dividing the CTU and that may need to be further divided.

When a division direction of a CU that needs to be further divided in the to-be-processed CUs is unique, the division information may indicate only a division type of the CU without indicating the division direction of the CU. In this way, bits occupied by the division information are reduced, thereby reducing occupied bit rates.

It should be understood that the division information may include division information of each to-be-determined CU in the CTU.

That the division direction of the first CU is unique may include the following several cases.

(3) A width-to-height ratio of the first CU is equal to a first preset value. The first preset value may be a maximum width-to-height ratio, namely, a maximum allowed value, indicated by the first information, of the width-to-height ratio of the CU.

(4) A width-to-height ratio of the first CU is equal to a second preset value. The second preset value may be a minimum width-to-height ratio, namely, a minimum allowed value, indicated by the first information, of the width-to-height ratio of the CU.

The width-to-height ratio is used as an example in (3) and (4) to indicate that the division direction of the first CU is unique. Actually, a height-to-width ratio may alternatively be used to indicate that the division direction of the first CU is unique. A specific indication manner is similar, and for brevity, details are not described herein again.

Optionally, the method in FIG. 8 further includes determining whether the width-to-height ratio of the CU obtained by dividing the CTU is limited by the value range indicated by the first information, and writing first flag information into the bitstream. The first flag information includes a first flag bit. When a value of the first flag bit is a first value, a value range of the width-to-height ratio of the CU obtained by dividing the CTU is unlimited, or when a value of the first flag bit is a second value, the width-to-height ratio of the CU obtained by dividing the CTU is limited by the value range indicated by the first information.

When the bitstream includes the first flag information, a value of the first flag bit in the first flag information needs to be first determined, and then, whether to parse the first information needs to be determined based on a value of the first flag bit. If a value of the first flag bit is the first value (for example, 0), the value range of the width-to-height ratio of the CU does not need to be considered during division of the CTU. Therefore, the first information does not need to be parsed. When a value of the first flag bit is the second value (for example, 1), the value range of the width-to-height ratio of the CU needs to be considered during division of the CTU. In this case, the first information needs to be parsed to determine the allowed value range of the width-to-height ratio of the CU obtained by dividing the CTU.

Alternatively, the first information may include only a second flag bit. When a value of the second flag bit is a third value, a value range of the width-to-height ratio of the CU obtained by dividing the CTU is unlimited, or when a value of the second flag bit is a fourth value, a value range of the width-to-height ratio of the CU obtained by dividing the CTU is a preset first value range. The first value range may be a preset default value range. The third value and the fourth value may be respectively 0 and 1, or 1 and 0.

The foregoing describes in detail the encoding method and the decoding method in the embodiments of this application with reference to FIG. 7 and FIG. 8. The following describes in detail an encoding method and a decoding method in embodiments of this application with reference to FIG. 9 and FIG. 10.

Figure 9:
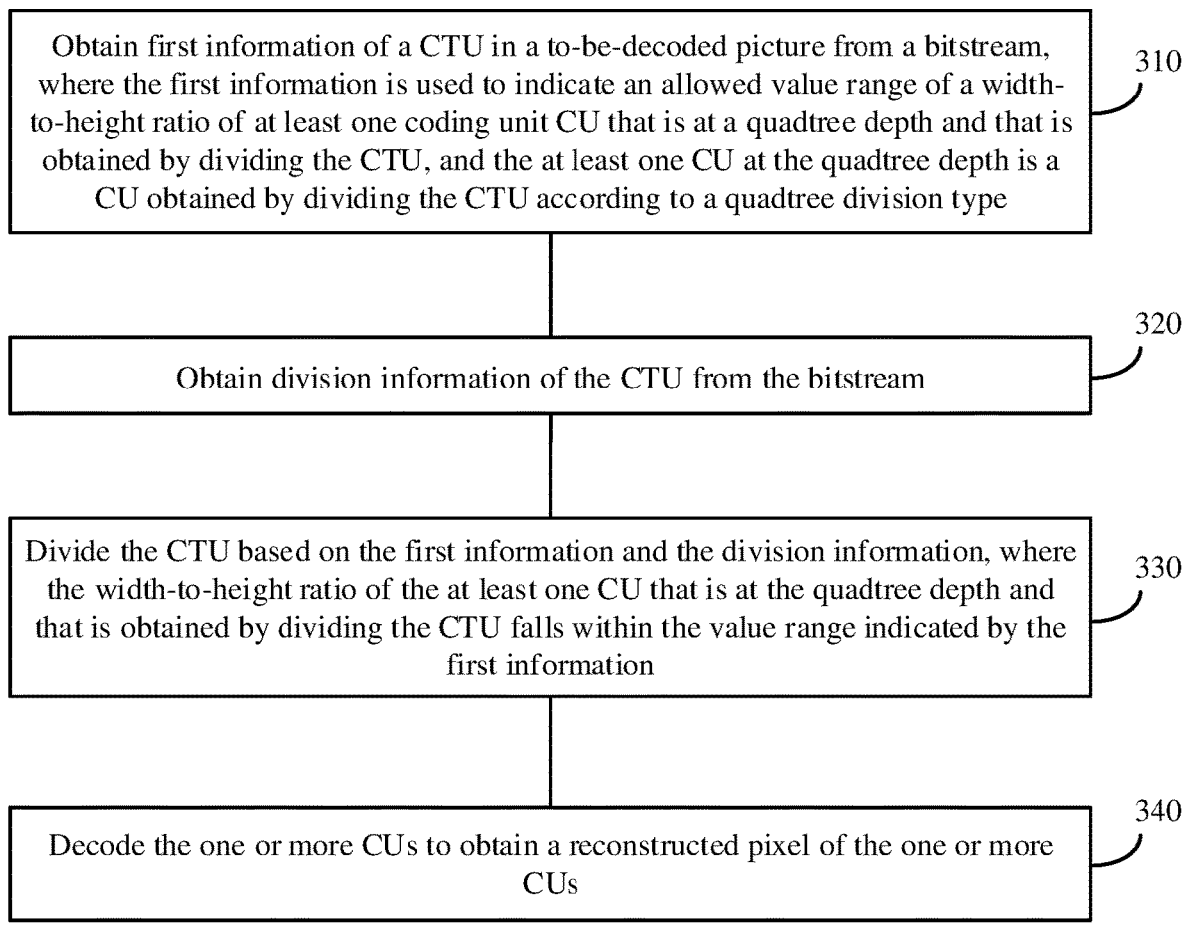
FIG. 9 is a schematic flowchart of a decoding method according to an embodiment of this application.

FIG. 9 is a schematic flowchart of a decoding method according to an embodiment of this application. The method in FIG. 9 may be performed by a decoder side device, a decoder, or another device with a decoding function. The method in FIG. 9 includes the following steps.

Step 310. Obtain first information of a CTU in a to-be-decoded picture from a bitstream, where the first information is used to indicate an allowed value range of a width-to-height ratio of at least one CU that is at a quadtree depth and that is obtained by dividing the CTU, and the at least one CU at the quadtree depth is a CU obtained by dividing the CTU according to a quadtree division type.

The ratio of a width to a height of the CU may be briefly referred to as a "width-to-height ratio" of the CU. The width-to-height ratio of the CU may be a ratio of a value of the width to a value of the height of the CU. The values of the width and the height may be represented by pixels.

In some feasible implementations, alternatively, the first information may be a value range of the height or the width of the CU. For example, an allowed height of the CU is 1/N of a height of a CU at a previous quadtree depth, where N is a preset integer, an allowed width of the CU is 1/M of a width of the CU at the previous quadtree depth, where M is a preset integer.

It should be understood that, in the methods shown in FIG. 7 and FIG. 8, the first information may indicate an allowed value range of a width-to-height ratio of a CU obtained by dividing an entire CTU, and in the method shown in FIG. 9, the first information indicates the allowed value range of the width-to-height ratio of the at least one CU at the quadtree depth.

It should be understood that, in some implementations, the quadtree depth is an example implementation, indicates a depth in a process of iteratively dividing the CTU into CUs, and is also applicable to a CU obtained in another division manner at the depth, for example, a CU obtained through binary tree division or ternary tree division.

Step 320. Obtain division information of the CTU from the bitstream.

Optionally, the first information is used to indicate the allowed value range of the width-to-height ratio of the at least one CU that is at the quadtree depth and that is obtained by dividing the CTU.

Further, the first information is used to indicate a maximum allowed width-to-height ratio of the at least one CU that is at the quadtree depth and that is obtained by dividing the CTU, or is used to indicate a minimum allowed width-to-height ratio of the at least one CU that is at the quadtree depth and that is obtained by dividing the CTU, or is used to indicate a maximum allowed width-to-height ratio and a minimum allowed width-to-height ratio of the at least one CU that is at the quadtree depth and that is obtained by dividing the CTU.

Alternatively, the first information may be used to indicate an allowed value range of a height-to-width ratio of the at least one CU that is at the quadtree depth and that is obtained by dividing the CTU.

Alternatively, the first information may be used to indicate an allowed value range of a ratio of a long side to a short side (or a ratio of the short side to the long side) of the at least one CU that is at the quadtree depth and that is obtained by dividing the CTU.

The bitstream may be a bitstream generated after an encoding side device or an encoder encodes a to-be-encoded picture.

The first information may be carried in any one of an SPS, a PPS, a slice header, or a slice segment header in the bitstream. Further, first information in an SPS corresponding to the to-be-decoded picture is used as first information of all CTUs in the to-be-decoded picture when the first information is included in the SPS, first information in a PPS corresponding to the to-be-decoded picture is used as first information of all CTUs in the to-be-decoded picture when the first information is included in the PPS, first information in a slice header corresponding to each slice in the to-be-decoded picture is used as first information of all CTUs in the slice when the first information is included in the slice header, or first information in a slice segment header corresponding to each slice segment in the to-be-decoded picture is used as first information of all CTUs in the slice segment when the first information is included in the slice segment header.

Step 330. Divide the CTU based on the first information and the division information, where the width-to-height ratio of the at least one CU that is at the quadtree depth and that is obtained by dividing the CTU falls within the value range indicated by the first information.

Step 340. Decode the one or more CUs to obtain a reconstructed pixel of the one or more CUs.

CU decoding includes processing such as entropy decoding, dequantization, inverse transform, prediction, and loop filtering.

In this application, the allowed value range of the width-to-height ratio of the CU obtained by dividing the CTU is obtained from the bitstream such that some division manners can be excluded based on the value range during decoding, and some division information previously used to indicate the division manners can be saved in the bitstream, thereby reducing occupied bit rates.

Optionally, the dividing the CTU into one or more CUs based on the first information and the division information may include dividing the CTU into one or more CUs based on the first information and the division information to obtain the at least one CU at the quadtree depth, and dividing, based on the first information and the division information, a first CU that needs to be further divided in the at least one CU at the quadtree depth.

During division of the CTU, the CTU may be first divided into the at least one CU at the quadtree depth according to a quadtree division type (which may be dividing the CTU into four CUs at the quadtree depth), and then a CU at the quadtree depth that needs to be further divided is further divided.

For example, if the CTU is divided into four CUs at the quadtree depth according to the quadtree division type, and only one CU at the quadtree depth needs to be further divided, the first information may indicate an allowed value range of a width-to-height ratio of a CU obtained by dividing the CU at the quadtree depth that needs to be further divided.

Optionally, the division information may include at least one of a division type or a division direction. When a division direction of the first CU is unique, the division information includes a division type of the first CU and does not include the division direction of the first CU, and the dividing, based on the first information and the division information, a first CU that needs to be further divided in the at least one CU at the quadtree depth includes dividing the first CU based on the first information and the division type of the first CU.

When a division direction of a CU that needs to be further divided in the to-be-processed CUs is unique, the division information may indicate only a division type of the CU without indicating the division direction of the CU. In this way, bits occupied by the division information are reduced, thereby reducing occupied bit rates.

That the division direction of the first CU is unique may include the following several cases.

(5) A width-to-height ratio of the first CU is equal to a first preset value.

The first preset value may be a maximum width-to-height ratio, namely, a maximum allowed value, indicated by the first information, of the width-to-height ratio of the CU. For example, the width-to-height ratio of the first CU is 8, the maximum width-to-height ratio is also 8, and an available division type of the CTU includes only a binary tree division type and/or a ternary tree division type. In this case, during division of the first CU, the first CU can be divided only in a vertical direction regardless of whether the binary tree division type or the ternary tree division type is used, and cannot be divided in a horizontal direction (because the width-to-height ratio further increases if division is performed in the horizontal direction). Therefore, the division information of the first CU does not need to include the division direction.

(6) A width-to-height ratio of the first CU is equal to a second preset value.

The second preset value may be a minimum width-to-height ratio, namely, a minimum allowed value, indicated by the first information, of the width-to-height ratio of the CU. For example, the width-to-height ratio of the first CU is ⅛, and the minimum width-to-height ratio is also ⅛, and a division type of the CTU includes only a binary tree division type and/or a ternary tree division type. In this case, similarly, during division of the first CU, the first CU can be divided only in a horizontal direction regardless of which division type is used. Therefore, the division information of the first CU does not need to include the division direction either.

The width-to-height ratio is used as an example in (5) and (6) to indicate that the division direction of the first CU is unique. Actually, a height-to-width ratio may alternatively be used to indicate that the division direction of the first CU is unique. A specific indication manner is similar, and for brevity, details are not described herein again.

Optionally, when the width-to-height ratio of the first CU is less than the maximum width-to-height ratio and greater than the minimum width-to-height ratio, the division information of the first CU includes the division type and the division direction of the first CU. In some cases, when the division direction of the first CU cannot be uniquely determined based on the first information, the division information of the first CU needs to include not only the division type of the first CU but also the division direction of the first CU.

Optionally, the method in FIG. 9 further includes determining whether the width-to-height ratio of the at least one CU that is at the quadtree depth and that is obtained by dividing the CTU is limited by the value range indicated by the first information.

Optionally, the method in FIG. 9 further includes obtaining first flag information from the bitstream, where the first flag information includes a first flag bit, and a value range of the width-to-height ratio of the at least one CU that is at the quadtree depth and that is obtained by dividing the CTU is unlimited when a value of the first flag bit is a first value, or the width-to-height ratio of the at least one CU that is at the quadtree depth and that is obtained by dividing the CTU is limited by the value range indicated by the first information when a value of the first flag bit is a second value. Determining whether the width-to-height ratio of the at least one CU that is at the quadtree depth and that is obtained by dividing the CTU is limited by the value range indicated by the first information includes determining, based on a value of the first flag bit, that the width-to-height ratio of the at least one CU that is at the quadtree depth and that is obtained by dividing the CTU is limited by the value range indicated by the first information.

Therefore, when the bitstream includes the first flag information, a value of the first flag bit in the first flag information needs to be first determined, and then, whether to parse the first information needs to be determined based on the value of the first flag bit. If a value of the first flag bit is the first value (for example, 0), the value range of the width-to-height ratio of the CU does not need to be considered during division of the CTU. Therefore, the first information does not need to be parsed. When a value of the first flag bit is the second value (for example, 1), the value range of the width-to-height ratio of the CU needs to be considered during division of the CTU. In this case, the first information needs to be parsed to determine the allowed value range of the width-to-height ratio of the CU obtained by dividing the CTU.

Optionally, in an embodiment, the first flag information includes a plurality of pieces of flag sub-information. Any one of the plurality of pieces of flag sub-information is used to indicate whether the range of the width-to-height ratio of the at least one CU at the QT depth is limited. When a value of the any piece of flag sub-information is the first value, the value range of the width-to-height ratio of the at least one CU at the QT depth is unlimited. When a value of the any piece of flag sub-information is the second value, the value range of the width-to-height ratio of the at least one CU at the QT depth is limited.

Alternatively, the first information may include only a second flag bit. When a value of the second flag bit is a third value, a value range of the width-to-height ratio of the at least one CU that is at the quadtree depth and that is obtained by dividing the CTU is unlimited, or when a value of the second flag bit is a fourth value, a value range of the width-to-height ratio of the at least one CU that is at the quadtree depth and that is obtained by dividing the CTU is a preset first value range.

For example, when the second flag bit is 0, the width-to-height ratio of the CU obtained by dividing the CTU is unlimited. When the second flag bit is 1, the range of the width-to-height ratio of the CU obtained by dividing the CTU is [⅛, 8] (that is, the width-to-height ratio is greater than or equal to ⅛ and less than or equal to 8). In this case, the first value range is from a minimum width-to-height ratio ⅛ to a maximum width-to-height ratio 8.

Optionally, the first information may be valid only for CUs at some QT depths in the CTU, for example, a CU at a QT depth that is less than or equal to 1 in the CTU, or a CU at a QT depth that is greater than 0 in the CTU, or a CU at a QT depth that is greater than or equal to 2 in the CTU, or CUs at QT depths that are equal to 0 and 2. A valid QT depth may be predefined as a default value. For example, valid QT depths are 0 and 1 by default, or a valid QT depth is greater than or equal to 2 by default. Alternatively, a valid QT depth may be explicitly obtained by parsing out a syntax element in the bitstream. For example, a syntax element in the bitstream is parsed out, and values 0, 1, and 2 of the syntax element respectively indicate that a valid QT depth is 0, 0 and 1, and 0, 1, and 2. For another example, four adjacent bits in the bitstream are parsed out, and a first bit to a fourth bit respectively indicate whether a QT depth 0, a QT depth 1, a QT depth 2, and a QT depth 3 are valid (0 indicates "invalid", and 1 indicates "valid").

Optionally, in an embodiment, the first information includes a plurality of pieces of sub-information. Any one of the plurality of pieces of sub-information is used to indicate an allowed value range of a width-to-height ratio of a CU obtained by dividing the at least one CU at the QT depth.

The plurality of pieces of sub-information may be in one-to-one correspondence with a plurality of QT depths, or one of the plurality of pieces of sub-information may be corresponding to at least two QT depths.

For example, the first information includes two pieces of sub-information. First sub-information is used to indicate an allowed value range of a width-to-height ratio of a CU obtained by dividing a CU at a QT depth 0, and second sub-information is used to indicate an allowed value range of a width-to-height ratio of a CU obtained by dividing a CU at a QT depth 1.

For another example, the first information includes two pieces of sub-information. First sub-information is used to indicate an allowed value range of a width-to-height ratio of a CU obtained by dividing CUs at QT depths 0 and 1, and second sub-information is used to indicate an allowed value range of a width-to-height ratio of a CU obtained by dividing a CU at a QT depth greater than 1.

For another example, the first information includes three pieces of sub-information. First sub-information is used to indicate an allowed value range of a width-to-height ratio of a CU obtained by dividing a CU at a QT depth 0, second sub-information is used to indicate an allowed value range of a width-to-height ratio of a CU obtained by dividing a CU at a QT depth 1, and third sub-information is used to indicate an allowed value range of a width-to-height ratio of a CU obtained by dividing a CU at a QT depth 2.

The first information can be used to more flexibly indicate allowed value ranges of width-to-height ratios of CUs that are obtained by dividing CUs at different QT depths such that the CTU can be divided more properly. For example, a relatively large value range of a width-to-height ratio may be set for a CU at a relatively small QT depth such that the CU can be divided into CUs in more different shapes, and a relatively small value range of a width-to-height ratio may be set for a CU at a relatively large QT depth such that the CU can be divided into CUs in fewer shapes, thereby reducing bits used to indicate division.

Optionally, the first information may be represented using a syntax element, and the syntax element may be encoded using a fixed-length code or a Golomb code, and the decoder side device obtains a value of the syntax element by parsing the bitstream, to obtain the first information.

The first information may be represented by one or more syntax elements. For example, when a long-side-to-short-side ratio is used to indicate the allowed value range of the ratio of the long side to the short side of the CU obtained by dividing the CTU, a maximum long-side-to-short-side ratio may be obtained using a syntax element A representing the first information. For example, when values of the syntax element A are 0, 1, and 2, maximum long-side-to-short-side ratios are respectively 4, 8, and 16, or when values of the syntax element A are 0, 1, and 2, maximum long-side-to-short-side ratios are respectively 16, 8, and 4.

It should be understood that a maximum width-to-height ratio, a minimum width-to-height ratio, a maximum height-to-width ratio, a minimum height-to-width ratio, or the like may be similarly obtained using the syntax element A representing the first information herein.

For example, when the maximum width-to-height ratio and the minimum width-to-height ratio are used to indicate the allowed value range of the width-to-height ratio of the CU obtained by dividing the CTU, the maximum width-to-height ratio and the minimum width-to-height ratio may be obtained respectively using a syntax element A and a syntax element B that represent the first information. For example, when values of the syntax element A are 0, 1, and 2, maximum width-to-height ratios are respectively 16, 8, and 4, and when values of the syntax element B are 0, 1, and 2, minimum width-to-height ratios are respectively 1/16, 1/8, and 1/4.

For example, when the maximum width-to-height ratio and the minimum width-to-height ratio are used to indicate the allowed value range of the width-to-height ratio of the CU obtained by dividing the CTU, the maximum width-to-height ratio and the minimum width-to-height ratio may be obtained using a syntax element A representing the first information. For example, a value 0 of the syntax element A indicates that the width-to-height ratio of the CU obtained by dividing the CTU is unlimited (or it may be considered that in this case, the maximum width-to-height ratio is a value that is large enough such as 64, and the minimum width-to-height ratio is a value that is small enough such as 1/64), a value 1 of the syntax element A indicates that the maximum width-to-height ratio is 4, and the minimum width-to-height ratio is 1/4, and a value 2 of the syntax element A indicates that the maximum width-to-height ratio is 8, and the minimum width-to-height ratio is 1/8.

The foregoing describes in detail the decoding method in this embodiment of this application from a perspective of the decoder side with reference to FIG. 9. The following describes an encoding method in an embodiment of this application from a perspective of an encoder side with reference to FIG. 10. It should be understood that, steps in the encoding method described below with reference to FIG. 10 correspond to the steps in the decoding method described above with reference to FIG. 9. For brevity, repeated descriptions are appropriately omitted.

Figure 10:
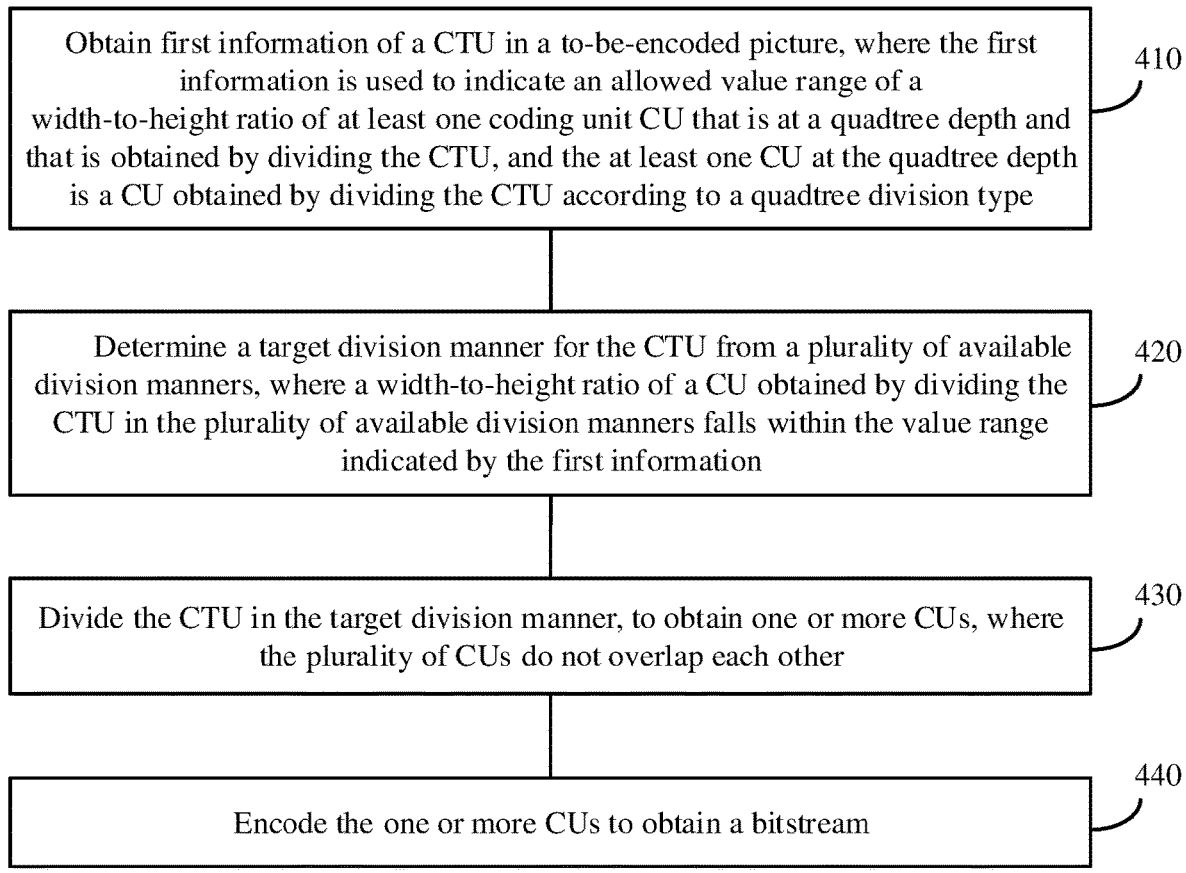
FIG. 10 is a schematic flowchart of an encoding method according to an embodiment of this application.

FIG. 10 is a schematic flowchart of an encoding method according to an embodiment of this application. The method in FIG. 10 may be performed by an encoder side device, an encoder, or another device with an encoding function. The method in FIG. 10 includes the following steps.

Step 410. Obtain first information of a CTU in a to-be-encoded picture, where the first information is used to indicate an allowed value range of a width-to-height ratio of at least one CU that is at a quadtree depth and that is obtained by dividing the CTU, and the at least one CU at the quadtree depth is a CU obtained by dividing the CTU according to a quadtree division type.

Optionally, the first information is used to indicate a maximum allowed width-to-height ratio of the at least one CU that is at the quadtree depth and that is obtained by dividing the CTU, or is used to indicate a minimum allowed width-to-height ratio of the at least one CU that is at the quadtree depth and that is obtained by dividing the CTU, or is used to indicate a maximum allowed width-to-height ratio and a minimum allowed width-to-height ratio of the at least one CU that is at the quadtree depth and that is obtained by dividing the CTU.

Alternatively, the first information may be used to indicate an allowed value range of a height-to-width ratio of the at least one CU that is at the quadtree depth and that is obtained by dividing the CTU.

Alternatively, the first information may indicate an allowed value range of a ratio of a long side to a short side of the at least one CU that is at the quadtree depth and that is obtained by dividing the CTU, and whether the width-to-height ratio or the height-to-width ratio is further indicated is not considered. Further, the first information may be used to indicate a maximum allowed long-side-to-short-side ratio of the CU obtained by dividing the CTU.

Optionally, the first information may be carried in any one of a sequence parameter set, a picture parameter set, a slice header, or a slice segment header corresponding to the to-be-encoded picture.

Further, an allowed value range of a width-to-height ratio of a CU obtained by dividing a CTU in a sequence, a picture, a slice, or a slice segment may be first set (i.e., first information is first determined), and then the first information is written into any one of an SPS, a PPS, a slice header, or a slice segment header.

For example, first information in a sequence parameter set corresponding to the to-be-encoded picture is used as first information of all CTUs in the to-be-encoded picture when the first information is included in the sequence parameter set, first information in a picture parameter set corresponding to the to-be-encoded picture is used as first information of all CTUs in the to-be-encoded picture when the first information is included in the picture parameter set, first information in a slice header corresponding to each slice in the to-be-encoded picture is used as first information of all CTUs in the slice when the first information is included in the slice header, or first information in a slice segment header corresponding to each slice segment in the to-be-encoded picture is used as first information of all CTUs in the slice segment when the first information is included in the slice segment header.

Step 420. Determine a target division manner for the CTU from a plurality of available division manners, where a width-to-height ratio of a CU obtained by dividing the CTU in the plurality of available division manners falls within the value range indicated by the first information.

Step 430. Divide the CTU in the target division manner, to obtain one or more CUs, where the plurality of CUs do not overlap each other.

Optionally, determining a target division manner for the CTU from a plurality of available division manners includes determining the target division manner for the CTU from the plurality of available division manners according to a rate-distortion optimization algorithm. Further, the CTU may be divided in the plurality of available division manners, a rate-distortion cost corresponding to each division manner is calculated according to the rate-distortion optimization algorithm, and a division manner corresponding to a lowest rate-distortion cost is selected as the target division manner for the CTU.

Because dividing the CTU in the plurality of available division manners is limited by the value range indicated by the first information, when the target division manner is determined according to the rate-distortion optimization algorithm, only a division manner that can meet a requirement of the value range indicated by the first information needs to be considered. This reduces complexity of determining the target division manner.

Step 440. Encode the one or more CUs to obtain a bitstream.

In this embodiment of this application, during encoding of the CTU, the target division manner for the CTU can be determined from the plurality of division manners that meet the requirement of the value range indicated by the first information such that some division manners can be prevented from being used to divide the CTU during encoding, thereby simplifying a process of determining the target division manner and reducing encoding complexity.

Optionally, in an embodiment, the method in FIG. 10 further includes determining division information of the CTU, where the division information is used to indicate the target division manner, and writing the division information into the bitstream.

Optionally, the division information may include at least one of a division type or a division direction, and when a division direction of a first CU that needs to be further divided in the at least one CU at the quadtree depth is unique, the division information includes a division type of the first CU and does not include the division direction of the first CU.

When a division direction of a CU that needs to be further divided in the to-be-processed CUs is unique, the division information may indicate only a division type of the CU without indicating the division direction of the CU. In this way, bits occupied by the division information are reduced, thereby reducing occupied bit rates.

That the division direction of the first CU is unique may include the following several cases.

(7) A width-to-height ratio of the first CU is equal to a first preset value. The first preset value may be a maximum width-to-height ratio, namely, a maximum allowed value, indicated by the first information, of the width-to-height ratio of the CU.

(8) A width-to-height ratio of the first CU is equal to a second preset value. The second preset value may be a minimum width-to-height ratio, namely, a minimum allowed value, indicated by the first information, of the width-to-height ratio of the CU.

It should be understood that the width-to-height ratio is used as an example in (7) and (8) to indicate that the division direction of the first CU is unique. Actually, a height-to-width ratio may alternatively be used to indicate that the division direction of the first CU is unique. A specific indication manner is similar, and for brevity, details are not described herein again.

Optionally, the method in FIG. 10 further includes determining that the width-to-height ratio of the at least one CU that is at the quadtree depth and that is obtained by dividing the CTU is limited by the value range indicated by the first information, and writing first flag information into the bitstream, where the first flag information includes a first flag bit, and determining that a value range of the width-to-height ratio of the at least one CU that is at the quadtree depth and that is obtained by dividing the CTU is unlimited when a value of the first flag bit is a first value, or determining that the width-to-height ratio of the at least one CU that is at the quadtree depth and that is obtained by dividing the CTU is limited by the value range indicated by the first information when a value of the first flag bit is a second value.

Alternatively, the first information may include only a second flag bit. When a value of the second flag bit is a third value, a value range of the width-to-height ratio of the at least one CU that is at the quadtree depth and that is obtained by dividing the CTU is unlimited, or when a value of the second flag bit is a fourth value, a value range of the width-to-height ratio of the at least one CU that is at the quadtree depth and that is obtained by dividing the CTU is a preset first value range. The third value and the fourth value may be respectively 0 and 1, or 1 and 0.

The foregoing describes in detail the encoding method and the decoding method in the embodiments of this application with reference to FIG. 1 to FIG. 10. The following describes an encoding apparatus and a decoding apparatus in embodiments of this application with reference to FIG. 11 to FIG. 14.

It should be understood that the encoding apparatus and the decoding apparatus shown in FIG. 11 to FIG. 14 can respectively perform steps in the encoding method and the decoding method shown in FIG. 7 to FIG. 10. For brevity, repeated descriptions are appropriately omitted.

Figure 11:
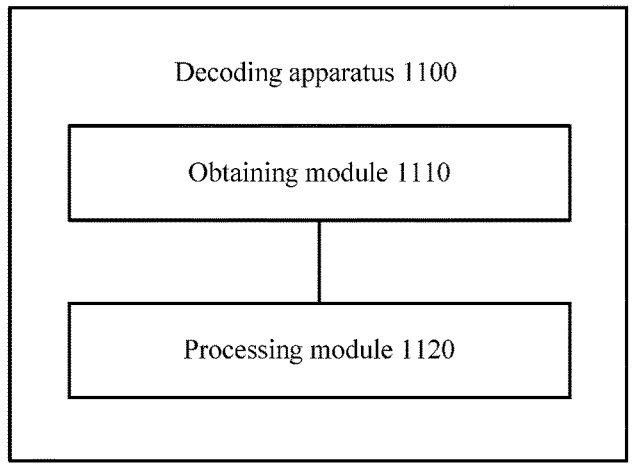
FIG. 11 is a schematic block diagram of a decoding apparatus according to an embodiment of this application.

FIG. 11 is a schematic block diagram of a decoding apparatus according to an embodiment of this application. The decoding apparatus 1100 in FIG. 11 includes an obtaining module 1110 configured to obtain first information of a CTU in a to-be-decoded picture from a bitstream, where the first information is used to indicate an allowed value range of a width-to-height ratio of a CU obtained by dividing the CTU, where the obtaining module 1110 is further configured to obtain division information of the CTU from the bitstream, and a processing module 1120 configured to divide the CTU into one or more CUs based on the first information and the division information, where a width-to-height ratio of the one or more CUs falls within the value range indicated by the first information, and the plurality of CUs do not overlap each other, where the processing module 1120 is further configured to decode the one or more CUs to obtain a reconstructed pixel of the one or more CUs.

Optionally, in an embodiment, the processing module 1120 is further configured to divide the CTU based on the first information and the division information, to obtain one or more to-be-processed CUs, and divide, based on the first information and the division information, a first CU that needs to be further divided in the one or more to-be-processed CUs.

Optionally, in an embodiment, the division information includes at least one of a division type or a division direction, and when a division direction of the first CU is unique, the division information includes a division type of the first CU and does not include the division direction of the first CU, and the processing module 1120 is further configured to divide the first CU based on the first information and the division type of the first CU.

Optionally, in an embodiment, that the division direction of the first CU is unique includes that a width-to-height ratio of the first CU is equal to a first preset value, where the first preset value is a preset maximum allowed value of the width-to-height ratio of the CU obtained by dividing the CTU.

Optionally, in an embodiment, that the division direction of the first CU is unique includes that a width-to-height ratio of the first CU is equal to a second preset value, where the second preset value is a preset minimum allowed value of the width-to-height ratio of the CU obtained by dividing the CTU.

Optionally, in an embodiment, the first information is used to indicate the maximum allowed width-to-height ratio of the CU obtained by dividing the CTU, or is used to indicate the minimum allowed width-to-height ratio of the CU obtained by dividing the CTU, or is used to indicate the maximum allowed width-to-height ratio and the minimum allowed width-to-height ratio of the CU obtained by dividing the CTU.

Optionally, in an embodiment, before dividing the CTU into one or more CUs based on the first information and the division information, the processing module 1120 is further configured to determine that the width-to-height ratio of the CU obtained by dividing the CTU is limited by the value range indicated by the first information.

Optionally, in an embodiment, the obtaining module 1110 is further configured to obtain first flag information from the bitstream, where the first flag information includes a first flag bit, and when a value of the first flag bit is a first value, it is determined that a value range of the width-to-height ratio of the CU obtained by dividing the CTU is unlimited, or when a value of the first flag bit is a second value, it is determined that the width-to-height ratio of the CU obtained by dividing the CTU is limited by the value range indicated by the first information. The processing module 1120 is further configured to determine, based on a value of the first flag bit, whether the CU obtained by dividing the CTU is limited by the value range indicated by the first information.

Optionally, in an embodiment, the first information includes a second flag bit. When a value of the second flag bit is a third value, a value range of the width-to-height ratio of the CU obtained by dividing the CTU is unlimited, or when a value of the second flag bit is a fourth value, a value range of the width-to-height ratio of the CU obtained by dividing the CTU is a preset first value range.

Optionally, in an embodiment, the first information is carried in any one of a sequence parameter set, a picture parameter set, a slice header, or a slice segment header in the bitstream.

Figure 12:
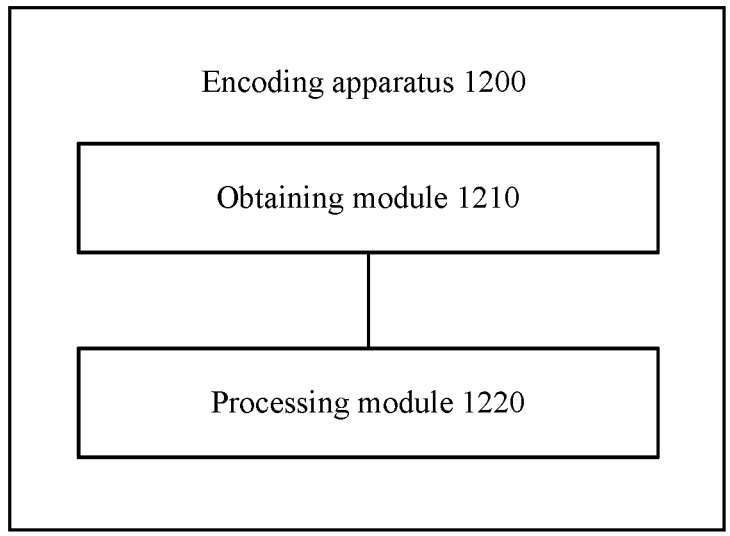
FIG. 12 is a schematic block diagram of an encoding apparatus according to an embodiment of this application.

FIG. 12 is a schematic block diagram of an encoding apparatus according to an embodiment of this application. The encoding apparatus 1200 in FIG. 12 includes an obtaining module 1210 configured to obtain first information of a CTU in a to-be-encoded picture, where the first information is used to indicate an allowed value range of a width-to-height ratio of a CU obtained by dividing the CTU, and a processing module 1220 configured to determine a target division manner for the CTU from a plurality of available division manners, where a width-to-height ratio of a CU obtained by dividing the CTU in the plurality of available division manners falls within the value range indicated by the first information, where the processing module 1220 is further configured to divide the CTU in the target division manner to obtain one or more CUs, where the plurality of CUs do not overlap each other, and the processing module 1220 is further configured to encode the one or more CUs to obtain a bitstream.

Optionally, in an embodiment, the processing module 1220 is further configured to determine the target division manner for the CTU from the plurality of available division manners according to a rate-distortion optimization algorithm.

Optionally, in an embodiment, the processing module 1220 is further configured to determine division information of the CTU, where the division information is used to indicate the target division manner, and write the division information into the bitstream.

Optionally, in an embodiment, the division information includes at least one of a division type or a division direction, when a division direction of a first CU that needs to be further divided in one or more to-be-processed CUs is unique, the division information includes a division type of the first CU and does not include the division direction of the first CU, and the one or more to-be-processed CUs are obtained by dividing the CTU.

Optionally, in an embodiment, that the division direction of the first CU is unique includes that a width-to-height ratio of the first CU is equal to a first preset value, where the first preset value is a preset maximum allowed value of the width-to-height ratio of the CU obtained by dividing the CTU.

Optionally, in an embodiment, that the division direction of the first CU is unique includes that a width-to-height ratio of the first CU is equal to a second preset value, where the second preset value is a preset minimum allowed value of the width-to-height ratio of the CU obtained by dividing the CTU.

Optionally, in an embodiment, the first information is used to indicate the maximum allowed width-to-height ratio of the CU obtained by dividing the CTU, or is used to indicate the minimum allowed width-to-height ratio of the CU obtained by dividing the CTU, or is used to indicate the maximum allowed width-to-height ratio and the minimum allowed width-to-height ratio of the CU obtained by dividing the CTU.

Optionally, in an embodiment, the processing module 1220 is further configured to determine that the width-to-height ratio of the CU obtained by dividing the CTU is limited by the value range indicated by the first information, and write first flag information into the bitstream, where the first flag information includes a first flag bit, and when a value of the first flag bit is a first value, it is determined that a value range of the width-to-height ratio of the CU obtained by dividing the CTU is unlimited, or when a value of the first flag bit is a second value, it is determined that the width-to-height ratio of the CU obtained by dividing the CTU is limited by the value range indicated by the first information.

Optionally, in an embodiment, the first information includes a second flag bit. When a value of the second flag bit is a third value, a value range of the width-to-height ratio of the CU obtained by dividing the CTU is unlimited, or when a value of the second flag bit is a fourth value, a value range of the width-to-height ratio of the CU obtained by dividing the CTU is a preset first value range.

Optionally, in an embodiment, the first information is carried in any one of a sequence parameter set, a picture parameter set, a slice header, or a slice segment header that is in the bitstream and that is corresponding to the to-be-encoded picture.

Figure 13:
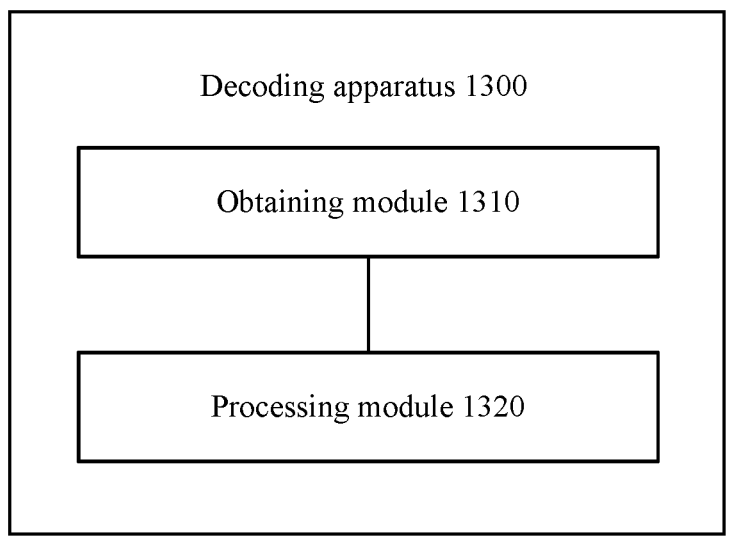
FIG. 13 is a schematic block diagram of a decoding apparatus according to an embodiment of this application.

FIG. 13 is a schematic block diagram of a decoding apparatus according to an embodiment of this application. The decoding apparatus 1300 in FIG. 13 includes an obtaining module 1310 configured to obtain first information of a CTU in a to-be-decoded picture from a bitstream, where the first information is used to indicate an allowed value range of a width-to-height ratio of at least one CU that is at a quadtree depth and that is obtained by dividing the CTU, and the at least one CU at the quadtree depth is a CU obtained by dividing the CTU according to a quadtree division type, where the obtaining module 1310 is further configured to obtain division information of the CTU from the bitstream, and a processing module 1320 configured to divide the CTU into one or more CUs based on the first information and the division information, where the width-to-height ratio of the at least one CU that is at the quadtree depth and that is obtained by dividing the CTU falls within the value range indicated by the first information, where the processing module 1320 is further configured to decode the one or more CUs to obtain a reconstructed pixel of the one or more CUs.

Optionally, in an embodiment, the processing module 1320 is further configured to divide the CTU based on the first information and the division information, to obtain the at least one CU at the quadtree depth, and divide, based on the first information and the division information, a first CU that needs to be further divided in the at least one CU at the quadtree depth.

Optionally, in an embodiment, the division information includes at least one of a division type or a division direction, when a division direction of the first CU is unique, the division information includes a division type of the first CU and does not include the division direction of the first CU, and the processing module 1320 is further configured to divide the first CU based on the first information and the division type of the first CU.

Optionally, in an embodiment, that the division direction of the first CU is unique includes a width-to-height ratio of the first CU is equal to a first preset value, where the first preset value is a preset maximum allowed value of the width-to-height ratio of the CU obtained by dividing the CTU.

Optionally, in an embodiment, that the division direction of the first CU is unique includes a width-to-height ratio of the first CU is equal to a second preset value, where the second preset value is a preset minimum allowed value of the width-to-height ratio of the CU obtained by dividing the CTU.

Optionally, in an embodiment, the first information is used to indicate the maximum allowed width-to-height ratio of the at least one CU that is at the quadtree depth and that is obtained by dividing the CTU, or is used to indicate the minimum allowed width-to-height ratio of the at least one CU that is at the quadtree depth and that is obtained by dividing the CTU, or is used to indicate the maximum allowed width-to-height ratio and the minimum allowed width-to-height ratio of the at least one CU that is at the quadtree depth and that is obtained by dividing the CTU.

Optionally, in an embodiment, before dividing the CTU into one or more CUs based on the first information and the division information, the processing module 1320 is further configured to determine that the width-to-height ratio of the at least one CU that is at the quadtree depth and that is obtained by dividing the CTU is limited by the value range indicated by the first information.

Optionally, in an embodiment, the processing module 1320 is further configured to obtain first flag information from the bitstream, where the first flag information includes a first flag bit, and when a value of the first flag bit is a first value, it is determined that a value range of the width-to-height ratio of the at least one CU that is at the quadtree depth and that is obtained by dividing the CTU is unlimited, or when a value of the first flag bit is a second value, it is determined that the width-to-height ratio of the at least one CU that is at the quadtree depth and that is obtained by dividing the CTU is limited by the value range indicated by the first information, and determine, based on a value of the first flag bit, that the width-to-height ratio of the at least one CU that is at the quadtree depth and that is obtained by dividing the CTU is limited by the value range indicated by the first information.

Optionally, in an embodiment, the first information includes a second flag bit. When a value of the second flag bit is a third value, a value range of the width-to-height ratio of the at least one CU that is at the quadtree depth and that is obtained by dividing the CTU is unlimited, or when a value of the second flag bit is a fourth value, a value range of the width-to-height ratio of the at least one CU that is at the quadtree depth and that is obtained by dividing the CTU is a preset first value range.

Optionally, in an embodiment, the first information is carried in any one of a sequence parameter set, a picture parameter set, a slice header, or a slice segment header in the bitstream.

Figure 14:
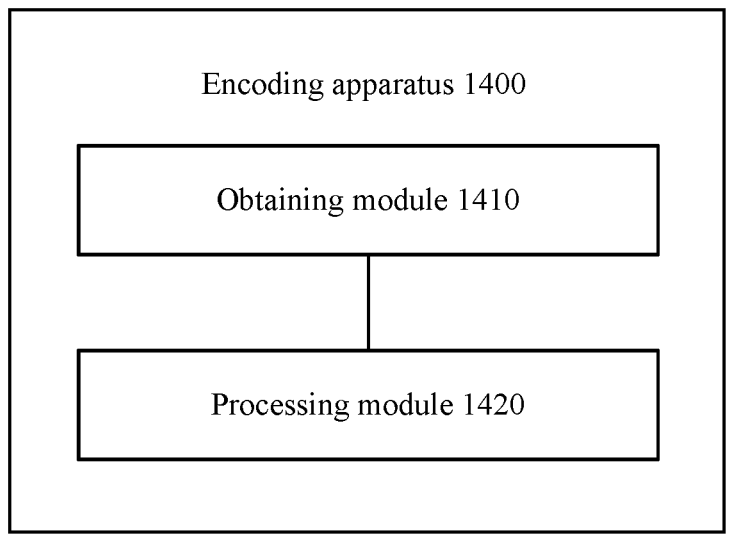
FIG. 14 is a schematic block diagram of an encoding apparatus according to an embodiment of this application.

FIG. 14 is a schematic block diagram of an encoding apparatus according to an embodiment of this application. The encoding apparatus 1400 in FIG. 14 includes an obtaining module 1410 configured to obtain first information of a CTU in a to-be-encoded picture, where the first information is used to indicate an allowed value range of a width-to-height ratio of at least one CU that is at a quadtree depth and that is obtained by dividing the CTU, and the at least one CU at the quadtree depth is a CU obtained by dividing the CTU according to a quadtree division type, and a processing module 1420 configured to determine a target division manner for the CTU from a plurality of available division manners, where a width-to-height ratio of a CU obtained by dividing the CTU in the plurality of available division manners falls within the value range indicated by the first information, where the processing module 1420 is further configured to divide the CTU in the target division manner to obtain one or more CUs, where the plurality of CUs do not overlap each other, and the processing module 1420 is further configured to encode the one or more CUs to obtain a bitstream.

Optionally, in an embodiment, the processing module 1420 is further configured to determine the target division manner for the CTU from the plurality of available division manners according to a rate-distortion optimization algorithm.

Optionally, in an embodiment, the processing module 1420 is further configured to determine division information of the CTU, where the division information is used to indicate the target division manner, and write the division information into the bitstream.

Optionally, in an embodiment, the division information includes at least one of a division type or a division direction, and when a division direction of a first CU that needs to be further divided in the at least one CU at the quadtree depth is unique, the division information includes a division type of the first CU and does not include the division direction of the first CU.

Optionally, in an embodiment, that the division direction of the first CU is unique includes that a width-to-height ratio of the first CU is equal to a first preset value, where the first preset value is a preset maximum allowed value of the width-to-height ratio of the CU obtained by dividing the CTU.

Optionally, in an embodiment, that the division direction of the first CU is unique includes that a width-to-height ratio of the first CU is equal to a second preset value, where the second preset value is a preset minimum allowed value of the width-to-height ratio of the CU obtained by dividing the CTU.

Optionally, in an embodiment, the first information is used to indicate the maximum allowed width-to-height ratio of the at least one CU that is at the quadtree depth and that is obtained by dividing the CTU, or is used to indicate the minimum allowed width-to-height ratio of the at least one CU that is at the quadtree depth and that is obtained by dividing the CTU, or is used to indicate the maximum allowed width-to-height ratio and the minimum allowed width-to-height ratio of the at least one CU that is at the quadtree depth and that is obtained by dividing the CTU.

Optionally, in an embodiment, the processing module 1420 is further configured to determine that the width-to-height ratio of the at least one CU that is at the quadtree depth and that is obtained by dividing the CTU is limited by the value range indicated by the first information, and write first flag information into the bitstream, where the first flag information includes a first flag bit, and when a value of the first flag bit is a first value, it is determined that a value range of the width-to-height ratio of the at least one CU that is at the quadtree depth and that is obtained by dividing the CTU is unlimited, or when a value of the first flag bit is a second value, it is determined that the width-to-height ratio of the at least one CU that is at the quadtree depth and that is obtained by dividing the CTU is limited by the value range indicated by the first information.

Optionally, in an embodiment, the first information includes a second flag bit. When a value of the second flag bit is a third value, a value range of the width-to-height ratio of the at least one CU that is at the quadtree depth and that is obtained by dividing the CTU is unlimited, or when a value of the second flag bit is a fourth value, a value range of the width-to-height ratio of the at least one CU that is at the quadtree depth and that is obtained by dividing the CTU is a preset first value range.

Optionally, in an embodiment, the first information is carried in any one of a sequence parameter set, a picture parameter set, a slice header, or a slice segment header that is in the bitstream and that is corresponding to the to-be-encoded picture.

Figure 15:
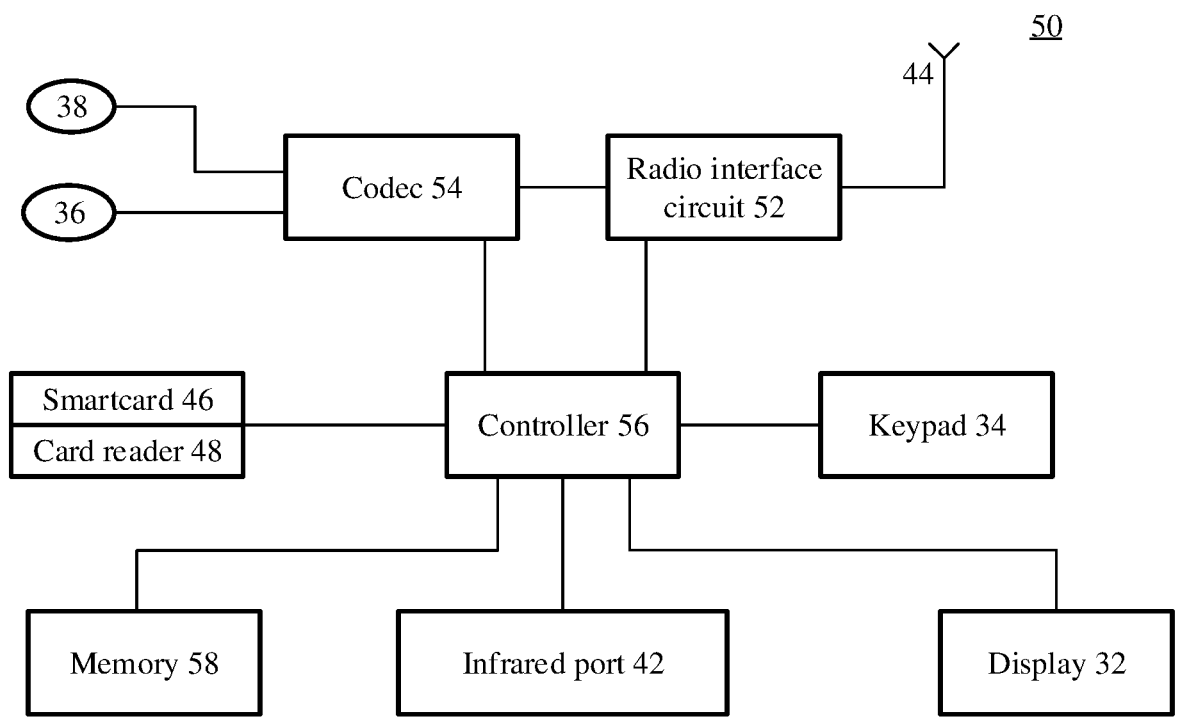
FIG. 15 is a schematic block diagram of a video decoding apparatus according to an embodiment of this application.
Figure 16:
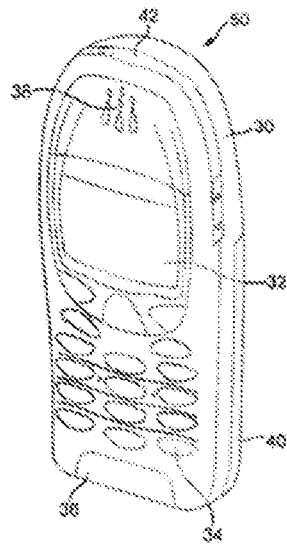
FIG. 16 is a schematic diagram of a video encoding apparatus according to an embodiment of this application.
Figure 17:
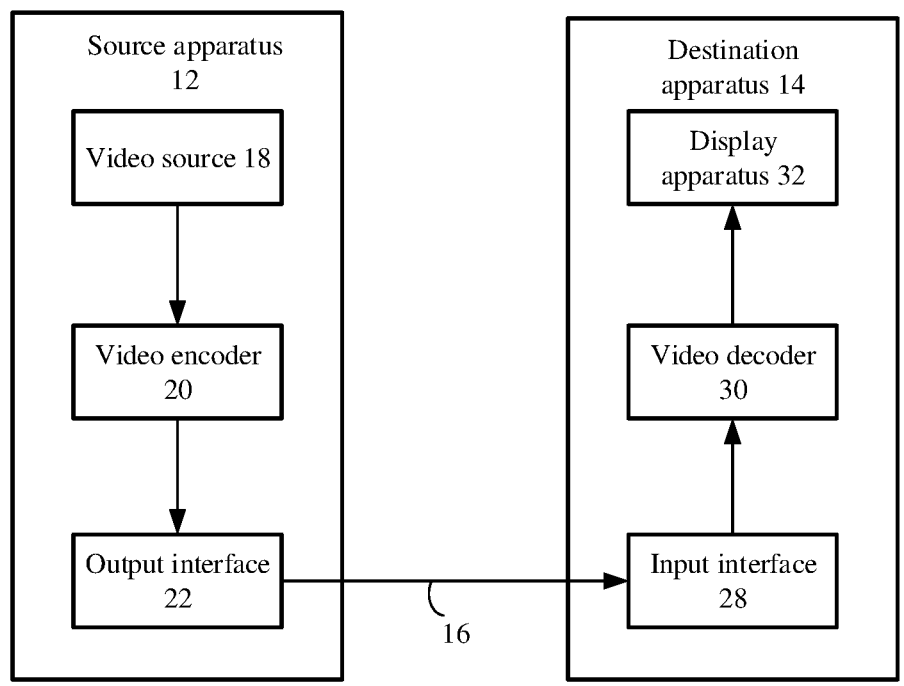
FIG. 17 is a schematic block diagram of a video encoding and decoding system according to an embodiment of this application.

With reference to FIG. 15 to FIG. 17, the following describes in detail an encoding and decoding apparatus, and an encoding and decoding system that includes an encoding apparatus and a decoding apparatus.

FIG. 15 and FIG. 16 are schematic diagrams of a video encoding and decoding apparatus 50 (or an electronic device having a video encoding and decoding function). The apparatus or the electronic device may be incorporated into a decoder in the encoding apparatus and the decoding apparatus in this application. The following describes units in FIG. 15 and FIG. 16 with reference to the accompanying drawings.

The encoding and decoding apparatus 50 may be a mobile terminal or user equipment in a wireless communications system. It should be understood that the embodiments of this application may be implemented in any electronic device or apparatus that may need to encode and/or decode a video picture.

The encoding and decoding apparatus 50 may include a housing 30 configured to be incorporated into the device and protect the device, a display 32 (which may be a liquid crystal display (LCD)), and a keypad 34. The encoding and decoding apparatus 50 may include a microphone 36 or any appropriate audio input, and the audio input may be a digital or analog signal input. The encoding and decoding apparatus 50 may further include the following audio output device. In this embodiment of this application, the audio output device may be any one of the following, a headset 38, a speaker, and an analog audio or digital audio output connection. The encoding and decoding apparatus 50 may also include a battery 40. In another embodiment of this application, the device may be powered by any appropriate mobile energy device such as a solar cell, a fuel cell, or a clock generator. The apparatus 50 may further include an infrared port 42 used for near-field line-of-sight communication with another device. In another embodiment, the encoding and decoding apparatus 50 may further include any appropriate near-field communication solution such as a BLUETOOTH wireless connection or a USB/live wire wired connection.

The encoding and decoding apparatus 50 may include a controller 56 or a processor configured to control the encoding and decoding apparatus 50. The controller 56 may be connected to a memory 58. In this embodiment of this application, the memory may store picture data and audio data, and/or may store an instruction to be executed on the controller 56. The controller 56 may be further connected to a codec 54 suitable for encoding and decoding audio and/or video data with the assistance of the controller 56.

The encoding and decoding apparatus 50 may further include a card reader 48 and a smartcard 46 that are configured to provide user information and are suitable for providing authentication information used for network authentication and user authorization, for example, a universal integrated circuit card (UICC) and a UICC reader.

The encoding and decoding apparatus 50 may further include a radio interface circuit 52, and the radio interface circuit 52 is connected to the controller 56 and is suitable for generating a wireless communications signal used to communicate with, for example, a cellular communications network, a wireless communications system, or a wireless local area network. The encoding and decoding apparatus 50 may further include an antenna 44, and the antenna is connected to the radio interface circuit 52 to send a radio frequency (RF) signal generated by the radio interface circuit 52 to one or more other apparatuses, and receive RF signals from the one or more other apparatuses.

In some embodiments of this application, the encoding and decoding apparatus 50 includes a camera that can record or detect a single frame, and the codec 54 or the controller 56 receives and processes the single frame. In some embodiments of this application, the encoding and decoding apparatus 50 may receive to-be-processed video picture data from another device before transmitting and/or storing the data. In some embodiments of this application, the encoding and decoding apparatus 50 may be configured to receive a picture through a wireless or wired connection and encode/decode the picture.

FIG. 17 is a schematic block diagram of a video encoding and decoding system 10 according to an embodiment of this application. As shown in FIG. 17, the video encoding and decoding system 10 includes a source apparatus 12 and a destination apparatus 14. The source apparatus 12 generates encoded video data, and therefore, the source apparatus 12 may be referred to as a video encoding apparatus or a video encoding device. The destination apparatus 14 may decode the encoded video data generated by the source apparatus 12, and therefore, the destination apparatus 14 may be referred to as a video decoding apparatus or a video decoding device. The source apparatus 12 and the destination apparatus 14 may be an example of a video encoding and decoding apparatus or a video encoding and decoding device. The source apparatus 12 and the destination apparatus 14 may include a desktop computer, a mobile computing apparatus, a notebook computer (for example, a laptop computer), a tablet computer, a set top box, a handheld device such as a smartphone, a television, a camera, a display apparatus, a digital media player, a video game console, an in-vehicle computer, or another similar device.

The destination apparatus 14 may receive the encoded video data from the source apparatus 12 using a channel 16. The channel 16 may include one or more media and/or apparatuses capable of moving the encoded video data from the source apparatus 12 to the destination apparatus 14. For example, the channel 16 may include one or more communications media that enable the source apparatus 12 to directly transmit the encoded video data to the destination apparatus 14 in real time. In this example, the source apparatus 12 may modulate the encoded video data according to a communications standard (for example, a wireless communications protocol), and transmit the modulated video data to the destination apparatus 14. The one or more communications media may include a wireless communications medium and/or a wired communications medium, such as an RF spectrum or one or more physical transmission lines. The one or more communications media may form a part of a packet-based network (for example, a local area network, a wide area network, or a global network (such as the Internet)). The one or more communications media may include a router, a switch, a base station, or another device that facilitates communication from the source apparatus 12 to the destination apparatus 14.

For another example, the channel 16 may include a storage medium storing the encoded video data generated by the source apparatus 12. In this example, the destination apparatus 14 may access the storage medium through disk access or card access. The storage medium may include a plurality of local access data storage media such as a BLU-RAY DISC, a digital versatile disc (DVD), a compact disc read-only memory (CD-ROM), and a flash memory, or other appropriate digital storage media for storing the encoded video data.

For another example, the channel 16 may include a file server or an intermediate storage apparatus storing the encoded video data generated by the source apparatus 12. In this example, the destination apparatus 14 may access, through streaming transmission or downloading, the encoded video data stored in the file server or the intermediate storage apparatus. The file server may be a server that can store the encoded video data and that can transmit the encoded video data to the destination apparatus 14. For example, the file server may include a web server (for example, used for a website), a File Transfer Protocol (FTP) server, a network attached storage (NAS) apparatus, and a local hard disk drive.

The destination apparatus 14 may access the encoded video data through a standard data connection (for example, an Internet connection). An example of the data connection includes a radio channel (for example, a WI-FI connection), a wired connection (for example, a DSL or a cable modem), or a combination thereof suitable for accessing the encoded video data stored in the file server. The encoded video data may be transmitted from the file server through streaming transmission, download transmission, or a combination thereof.

The encoding method and the decoding method in this application are not limited to a wireless application scenario. For example, the encoding method and the decoding method may be applied to video encoding and decoding supporting a plurality of multimedia applications such as the following applications over-the-air television broadcasting, cable television (TV) transmission, satellite TV transmission, streaming-transmission video transmission (for example, over the Internet), encoding of video data stored in a data storage medium, or decoding of video data stored in the data storage medium. In some examples, the video encoding and decoding system 10 may be configured to support unidirectional or bidirectional video transmission, to support applications such as video streaming transmission, video playing, video broadcasting, and/or video-telephony.

In the example of FIG. 17, the source apparatus 12 includes a video source 18, a video encoder 20, and an output interface 22. In some examples, the output interface 22 may include a modulator/demodulator (modem) and/or a transmitter. The video source 18 may include a video capture apparatus (for example, a video camera), a video file including previously captured video data, a video input interface configured to receive video data from a video content provider, and/or a computer graphics system configured to generate video data, or a combination of the foregoing video data sources.

The video encoder 20 may encode video data from the video source 18. In some examples, the source apparatus 12 directly transmits the encoded video data to the destination apparatus 14 using the output interface 22. The encoded video data may also be stored in the storage medium or the file server such that the destination apparatus 14 subsequently accesses the video data for decoding and/or playing.

In the example of FIG. 17, the destination apparatus 14 includes an input interface 28, a video decoder 30, and a display apparatus 32. In some examples, the input interface 28 includes a receiver and/or a modem. The input interface 28 may receive the encoded video data using the channel 16. The display apparatus 32 may be integrated into the destination apparatus 14 or may be outside the destination apparatus 14. Generally, the display apparatus 32 displays decoded video data. The display apparatus 32 may include a plurality of display apparatuses such as an LCD, a plasma display, an organic light-emitting diode (OLED) display, or another type of display apparatus.

The video encoder 20 and the video decoder 30 may operate according to a video compression standard (for example, the High Efficiency Video Coding H.265 standard) and may comply with a HEVC test model (HM). The text description ITU-TH.265 (V3) (04/2015) of the H.265 standard is released on Apr. 29, 2015 and can be downloaded from http://handle.itu.int/11.1002/1000/12455, and all content of the file is incorporated herein by reference.

It should be understood that in the implementations provided in this application, "B corresponding to A" indicates that B is associated with A, and B may be determined based on A. However, it should also be understood that determining B based on A does not mean that B is determined based only on A, and B may be determined based on A and/or other information.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected depending on actual requirements to achieve the objectives of the solutions of the embodiments.

In addition, functional units in the embodiments of this application may be integrated into one processing unit, or each of the units may exist alone physically, or at least two units may be integrated into one unit.

When the functions are implemented in the form of a software functional unit and sold or used as an independent product, the functions may be stored in a computer readable storage medium. Based on such an understanding, the technical solutions of this application essentially, or the part contributing to the other approaches, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes any medium that can store program code, such as a universal serial bus (USB) flash drive, a removable hard disk, a ROM, a RAM, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A decoding method, comprising:
   obtaining first information of a coding tree unit (CTU) in a to-be-decoded picture, wherein the first information indicates a maximum allowed width-to-height ratio of a coding unit (CU) obtained by dividing the CTU, and wherein the first information is signaled in a bitstream;
   obtaining division information of the CTU from the bitstream;
   dividing the CTU into one or more CUs based on the first information and the division information, wherein a width-to-height ratio of the one or more CUs is equal to or less than the maximum allowed width-to-height ratio indicated by the first information, and wherein the one or more CUs do not overlap each other;
   dividing a first CU in the one or more CUs that needs to be further divided based on the first information and the division information, wherein the first CU is not allowed to be divided in a horizontal direction when a width-to-height ratio of the first CU is equal to the maximum allowed width-to-height ratio; and
   decoding the one or more CUs to obtain a reconstructed pixel of the one or more CUs.

2. The decoding method of claim 1, wherein the division information comprises at least one of a division type or a division direction, wherein a division direction of the first CU is unique, wherein the division information further comprises a division type of the first CU and does not comprise the division direction of the first CU, and wherein dividing the first CU in the one or more CUs that needs to be further divided comprises dividing the first CU based on the first information and the division type of the first CU.

3. The decoding method of claim 2, wherein the division direction of the first CU is unique further comprises that the width-to-height ratio of the first CU is equal to a first preset value, and wherein the first preset value is a preset maximum allowed value of the width-to-height ratio of the CU obtained by dividing the CTU.

4. The decoding method of claim 2, wherein the division direction of the first CU is unique further comprises that the width-to-height ratio of the first CU is equal to a second preset value, and wherein the second preset value is a preset minimum allowed value of the width-to-height ratio of the CU obtained by dividing the CTU.

5. The decoding method of claim 1, wherein before dividing the CTU into the one or more CUs based on the first information and the division information, the method further comprises determining that the width-to-height ratio of the CU obtained by dividing the CTU is limited by an allowed value range indicated by the first information.

6. The decoding method of claim 5, wherein determining that the width-to-height ratio of the CU obtained by dividing the CTU is limited by the allowed value range indicated by the first information comprises:
obtaining first flag information from the bitstream, wherein the first flag information comprises a first flag bit;
determining that the allowed value range of the width-to-height ratio of the CU obtained by dividing the CTU is unlimited when a value of the first flag bit is a first value; and
determining that the width-to-height ratio of the CU obtained by dividing the CTU is limited by the allowed value range indicated by the first information when the value of the first flag bit is a second value.

7. The decoding method of claim 1, wherein the first information comprises a second flag bit, wherein an allowed value range of the width-to-height ratio of the CU obtained by dividing the CTU is unlimited when a value of the second flag bit is a third value, and wherein the allowed value range of the width-to-height ratio of the CU obtained by dividing the CTU is a preset first value range when the value of the second flag bit is a fourth value.

8. The decoding method of claim 1, wherein the first information is carried in any one of a sequence parameter set, a picture parameter set, a slice header, or a slice segment header in the bitstream.

9. A decoding method, comprising:
obtaining first information of a coding tree unit (CTU) in a to-be-decoded picture, wherein the first information indicates a minimum allowed width-to-height ratio of at least one coding unit (CU) obtained by dividing the CTU, and wherein the first information is signaled in a bitstream;
obtaining division information of the CTU from the bitstream;
dividing the CTU into one or more CUs based on the first information and the division information, wherein a width-to-height ratio of the one or more CUs is equal to or greater than the minimum allowed width-to-height ratio indicated by the first information;
dividing a first CU in the one or more CUs that needs to be further divided based on the first information and the division information, wherein the first CU is not allowed to be divided in a vertical direction when a width-to-height ratio of the first CU is equal to the minimum allowed width-to-height ratio; and
decoding the one or more CUs to obtain a reconstructed pixel of the one or more CUs.

10. The decoding method of claim 9, wherein the division information comprises at least one of a division type or a division direction, wherein when a division direction of the first CU is unique, the division information comprises a division type of the first CU and does not comprise the division direction of the first CU, and wherein the decoding method further comprises dividing the first CU in the one or more CUs that needs to be further divided at a quadtree depth by dividing the first CU based on the first information and the division type of the first CU.

11. The decoding method of claim 10, wherein the division direction of the first CU is unique further comprises that the width-to-height ratio of the first CU is equal to a first preset value, and wherein the first preset value is a preset maximum allowed value of the width-to-height ratio of the at least one CU obtained by dividing the CTU.

12. The decoding method of claim 10, wherein the division direction of the first CU is unique further comprises that the width-to-height ratio of the first CU is equal to a second preset value, and wherein the second preset value is a preset minimum allowed value of the width-to-height ratio of the at least one CU obtained by dividing the CTU.

13. The decoding method of claim 9, wherein before dividing the CTU into the one or more CUs based on the first information and the division information, the method further comprises determining that the width-to-height ratio of the at least one CU at a quadtree depth obtained by dividing the CTU is limited by an allowed value range indicated by the first information.

14. The decoding method of claim 13, wherein determining that the width-to-height ratio of the at least one CU at the quadtree depth obtained by dividing the CTU is limited by the allowed value range indicated by the first information comprises:
obtaining first flag information from the bitstream, wherein the first flag information comprises a first flag bit;
determining that the allowed value range of the width-to-height ratio of the at least one CU at the quadtree depth obtained by dividing the CTU is unlimited when a value of the first flag bit is a first value; and
determining that the width-to-height ratio of the at least one CU at the quadtree depth obtained by dividing the CTU is limited by the allowed value range indicated by the first information when the value of the first flag bit is a second value.

15. The decoding method of claim 9, wherein the first information comprises a second flag bit, wherein an allowed value range of the width-to-height ratio of the at least one CU at a quadtree depth obtained by dividing the CTU is unlimited when a value of the second flag bit is a third value, and wherein the allowed value range of the width-to-height ratio of the at least one CU at the quadtree depth obtained by dividing the CTU is a preset first value range when the value of the second flag bit is a fourth value.

16. The decoding method of claim 9, wherein the first information is carried in any one of a sequence parameter set, a picture parameter set, a slice header, or a slice segment header in the bitstream.

17. A computer program product comprising computer-executable instructions for storage on a non-transitory computer-readable medium that, when executed by a processor, cause an apparatus to:
obtain first information of a coding tree unit (CTU) in a to-be-decoded picture, wherein the first information indicates a maximum allowed width-to-height ratio of a coding unit (CU) obtained by dividing the CTU, and wherein the first information is signaled in a bitstream;
obtain division information of the CTU from the bitstream;
divide the CTU into one or more CUs based on the first information and the division information, wherein a width-to-height ratio of the one or more CUs is equal to or less than the maximum allowed width-to-height ratio indicated by the first information, and wherein the one or more CUs do not overlap each other;
divide a first CU in the one or more CUs that needs to be further divided based on the first information and the division information, wherein the first CU is not allowed to be divided in a horizontal direction when a width-to-height ratio of the first CU is equal to the maximum allowed width-to-height ratio; and decode the one or more CUs to obtain a reconstructed pixel of the one or more CUs.

18. The computer program product of claim 17, wherein the first information is carried in a sequence parameter set.

19. The computer program product of claim 17, wherein the first information is carried in a picture parameter set.

20. The computer program product of claim 17, wherein the first information is carried in a slice header or a slice segment header.

\* \* \* \* \*